Aug. 23, 1932.  W. J. F. FORWARD  1,873,376
MACHINE TOOL
Filed Nov. 30, 1927   19 Sheets-Sheet 1

INVENTOR
Worthy J. F. Forward
Harold R. Stonebraker
his ATTORNEY

Aug. 23, 1932.  W. J. F. FORWARD  1,873,376
MACHINE TOOL
Filed Nov. 30, 1927    19 Sheets-Sheet 2

INVENTOR
Worthy J. F. Forward
BY
Harold E. Stonebraker
his ATTORNEY

Aug. 23, 1932.   W. J. F. FORWARD   1,873,376
MACHINE TOOL
Filed Nov. 30, 1927   19 Sheets-Sheet 3
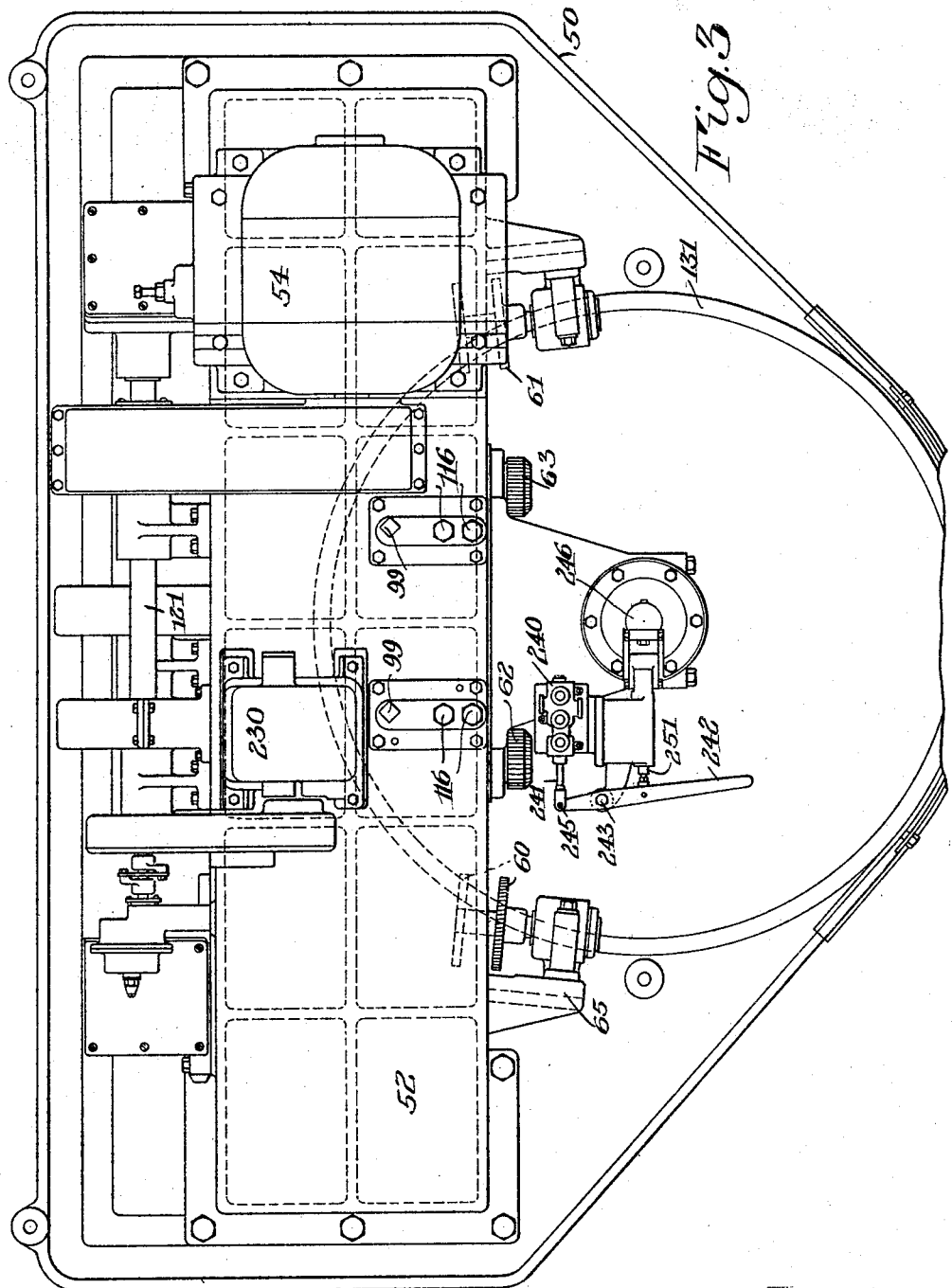
Inventor
Worthy J. F. Forward
By Harold E. Stonebraker,
his Attorney

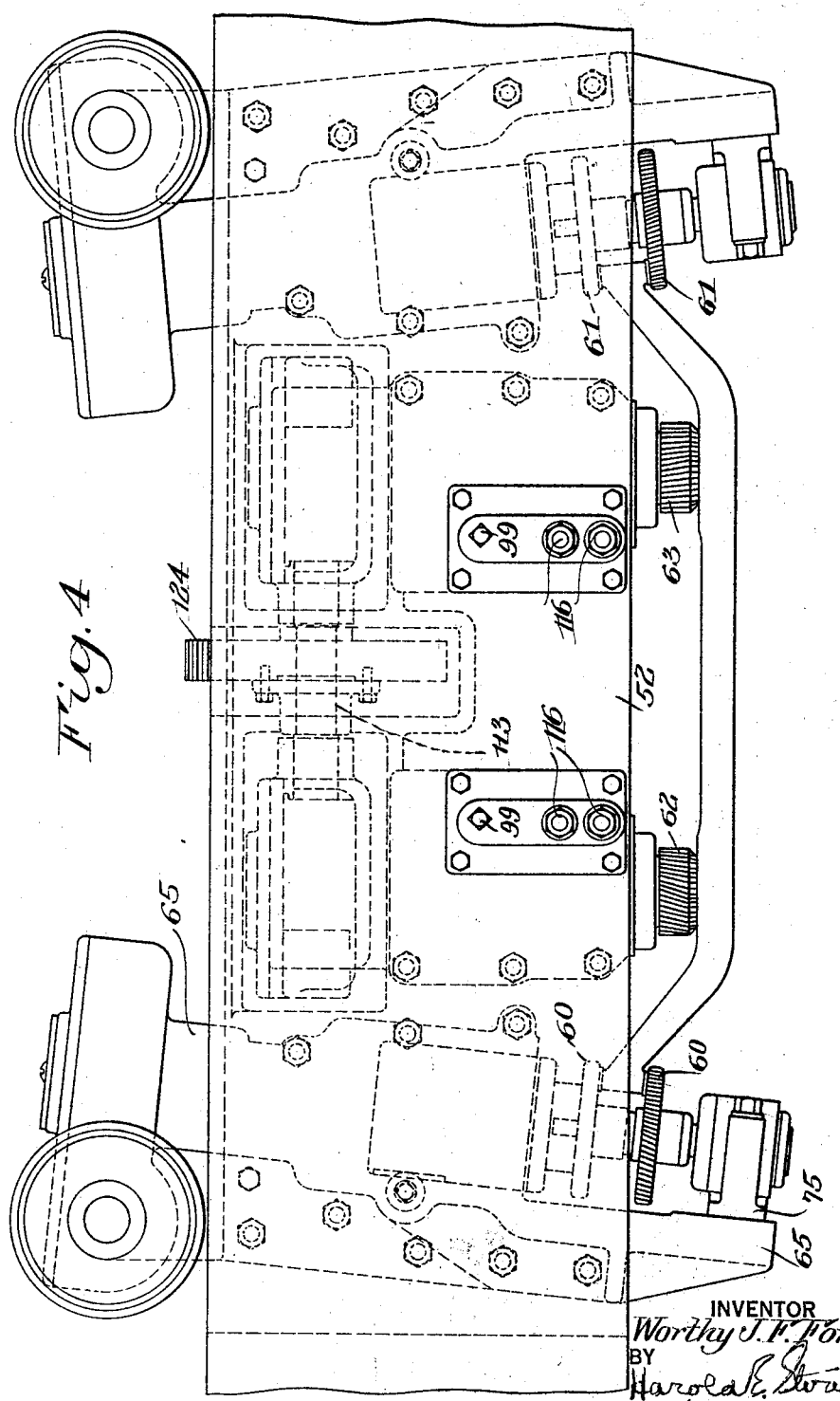

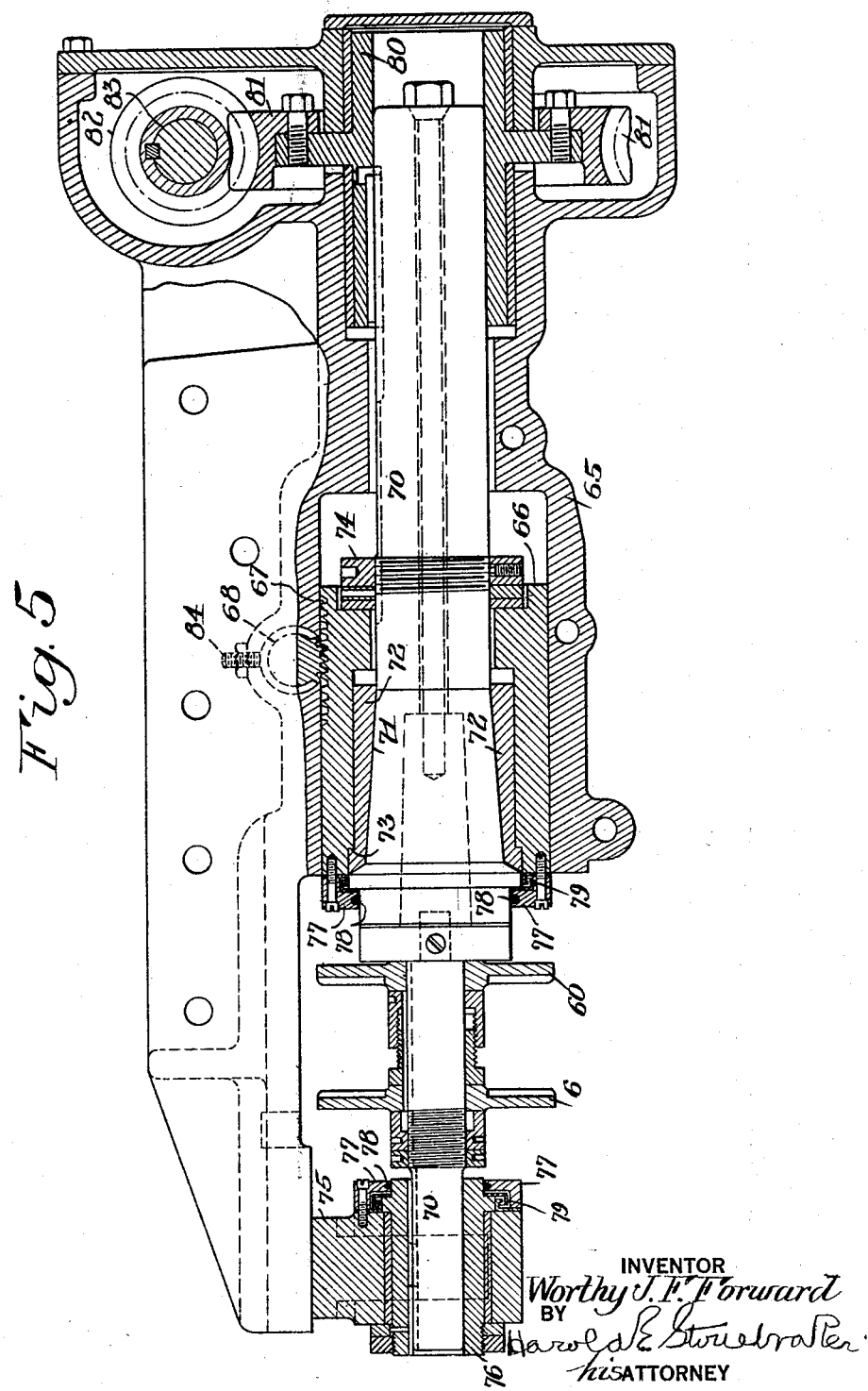

Aug. 23, 1932.  W. J. F. FORWARD  1,873,376
MACHINE TOOL
Filed Nov. 30, 1927   19 Sheets-Sheet 6
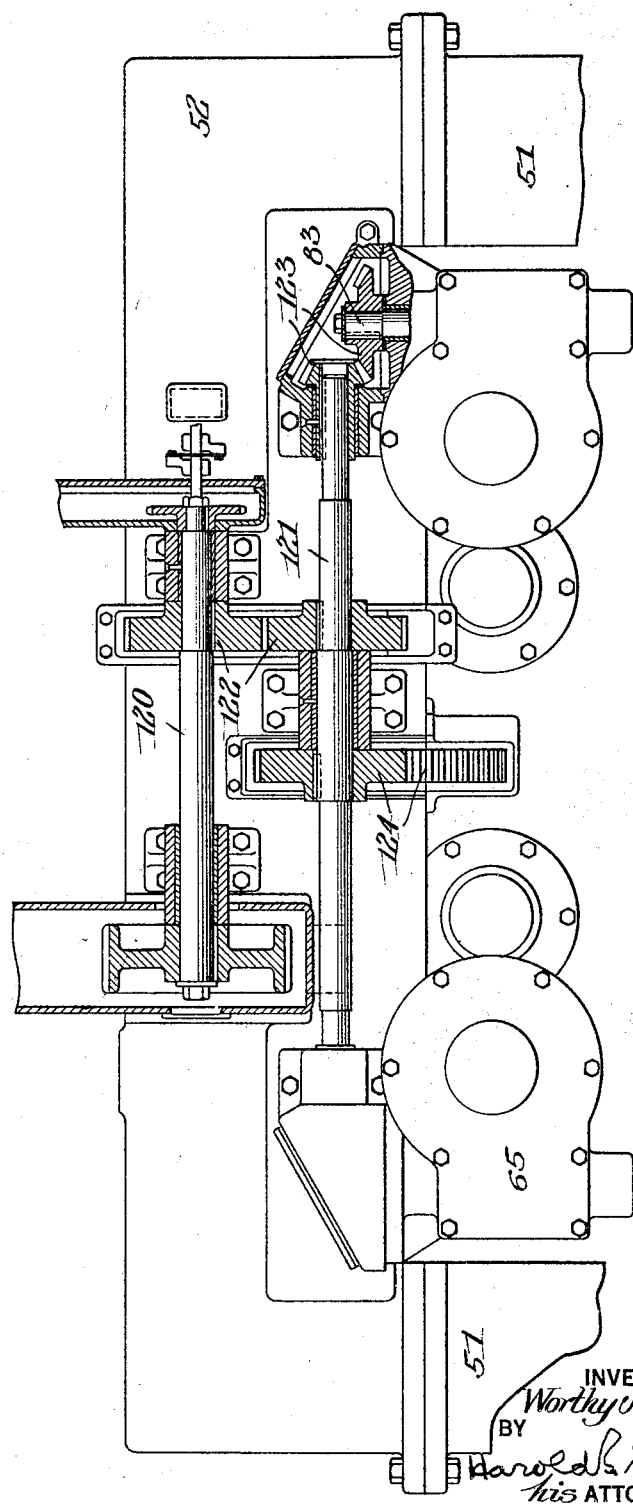
INVENTOR
Worthy J. F. Forward
BY
Harold B. Stonebraker
his ATTORNEY

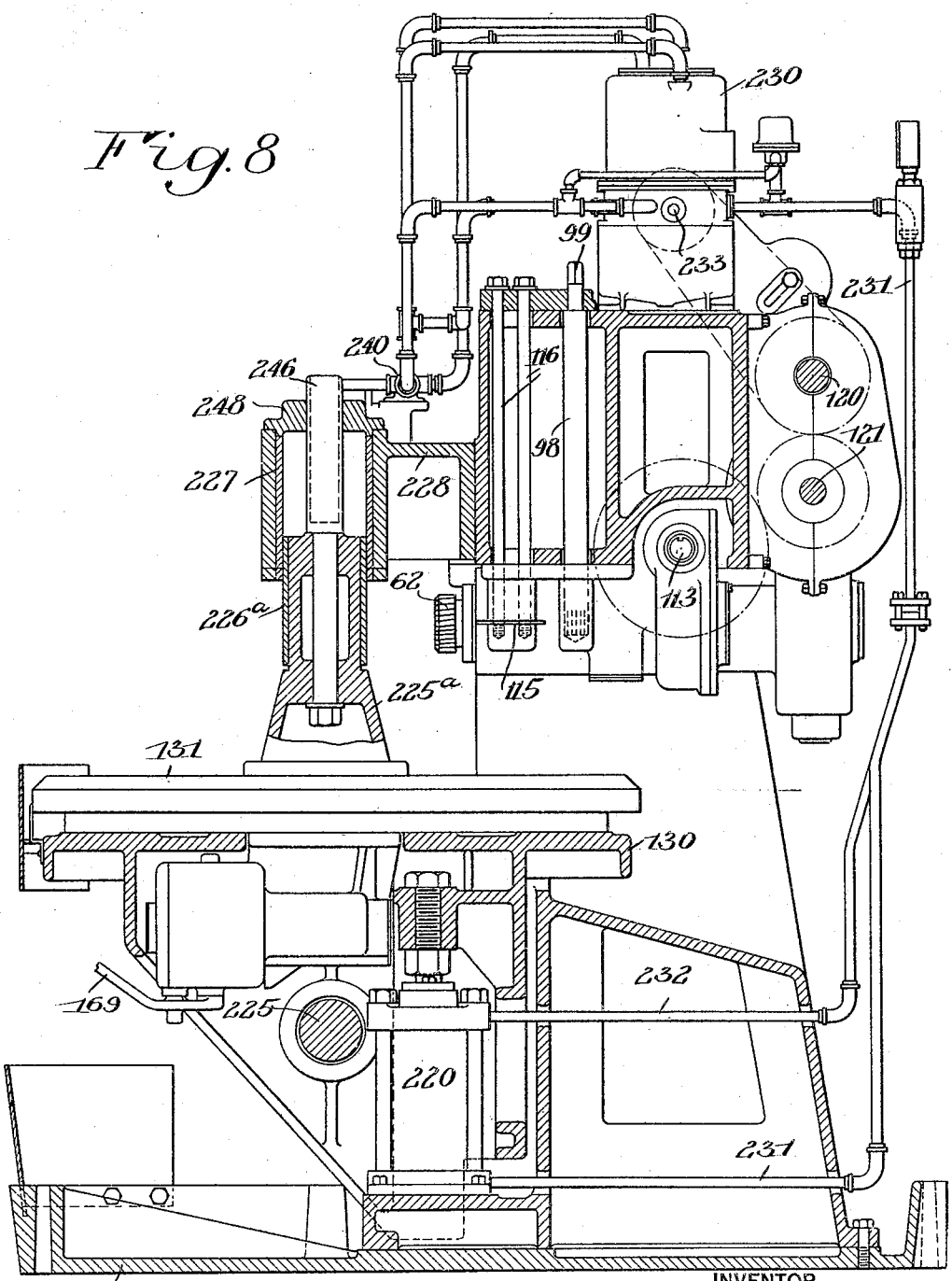

Aug. 23, 1932.  W. J. F. FORWARD  1,873,376
MACHINE TOOL
Filed Nov. 30, 1927  19 Sheets-Sheet 8

INVENTOR
Worthy J. F. Forward
BY
Harold E. Stonebraker
his ATTORNEY

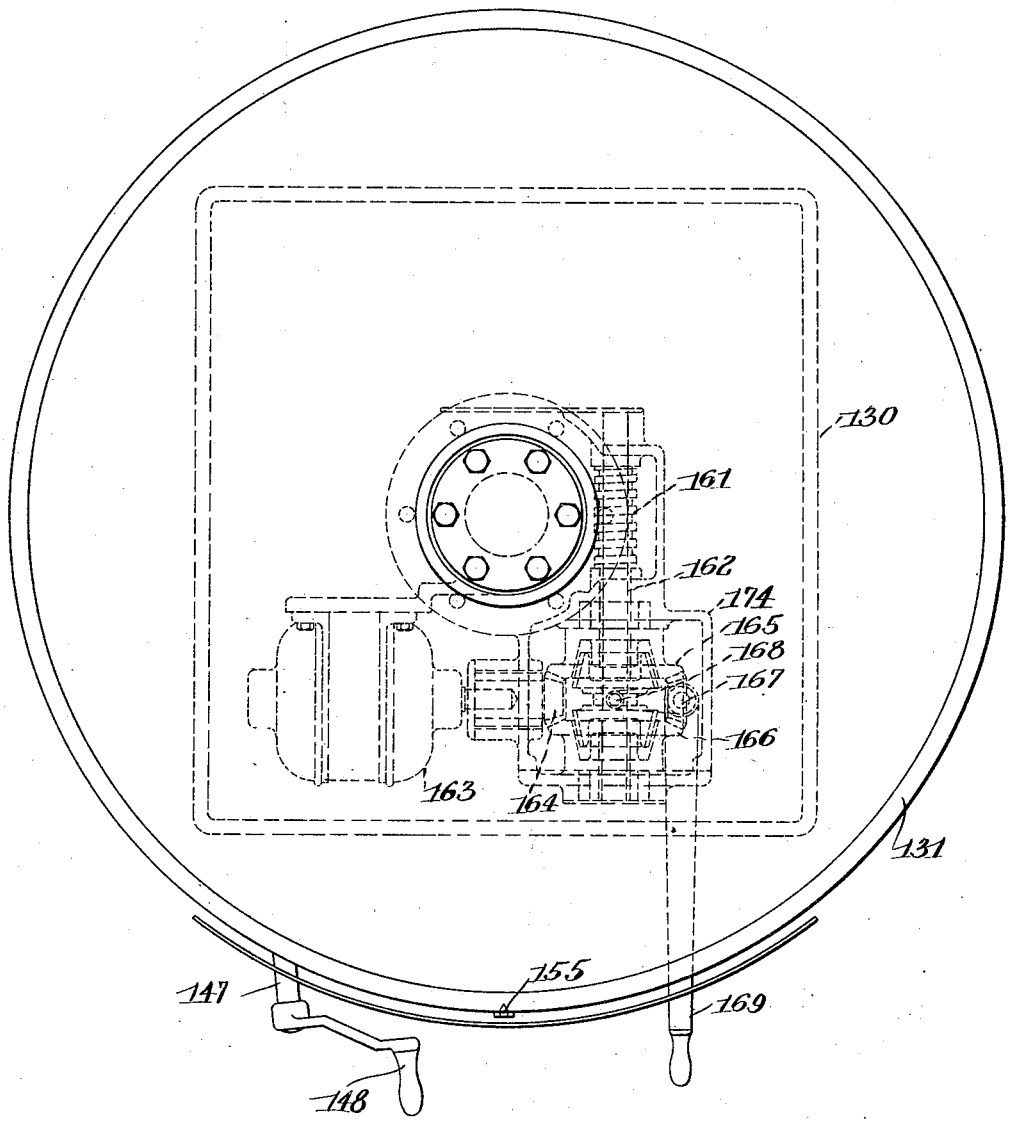

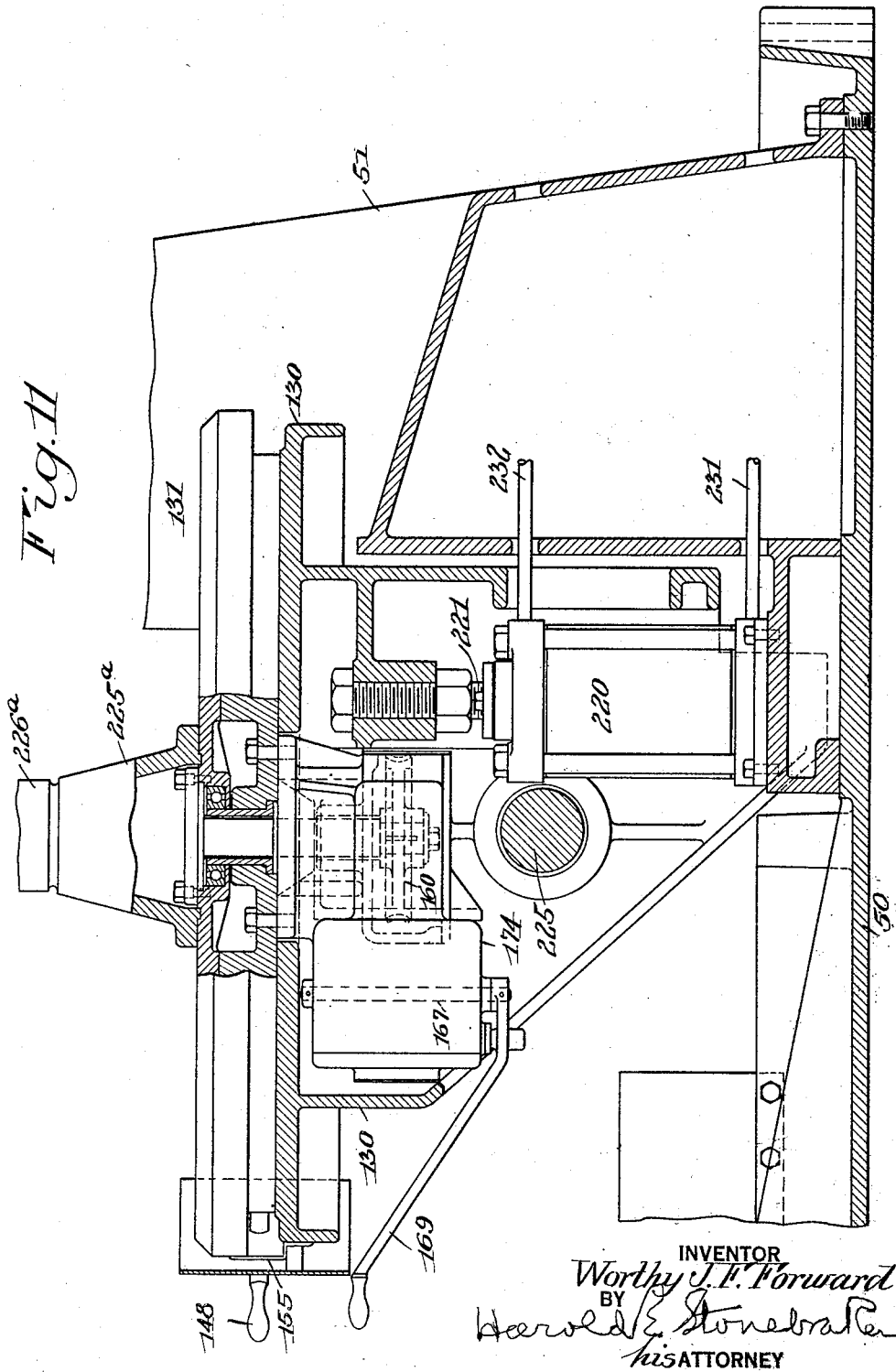

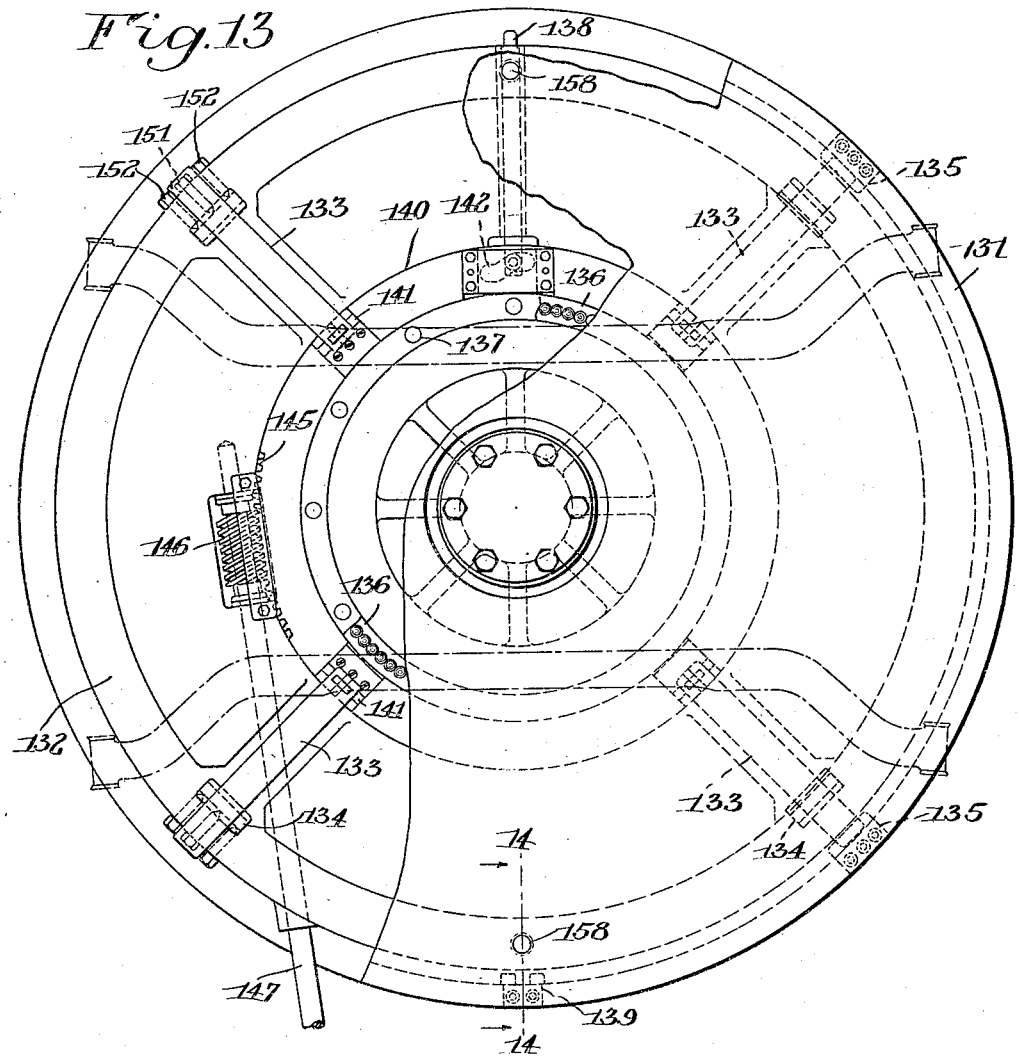
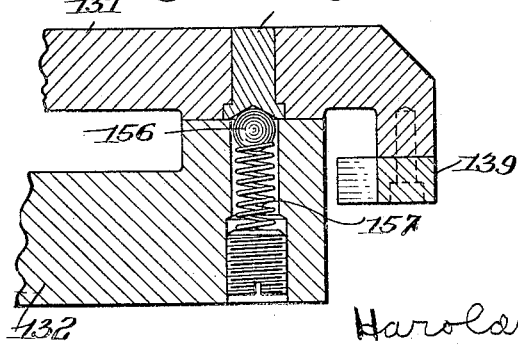

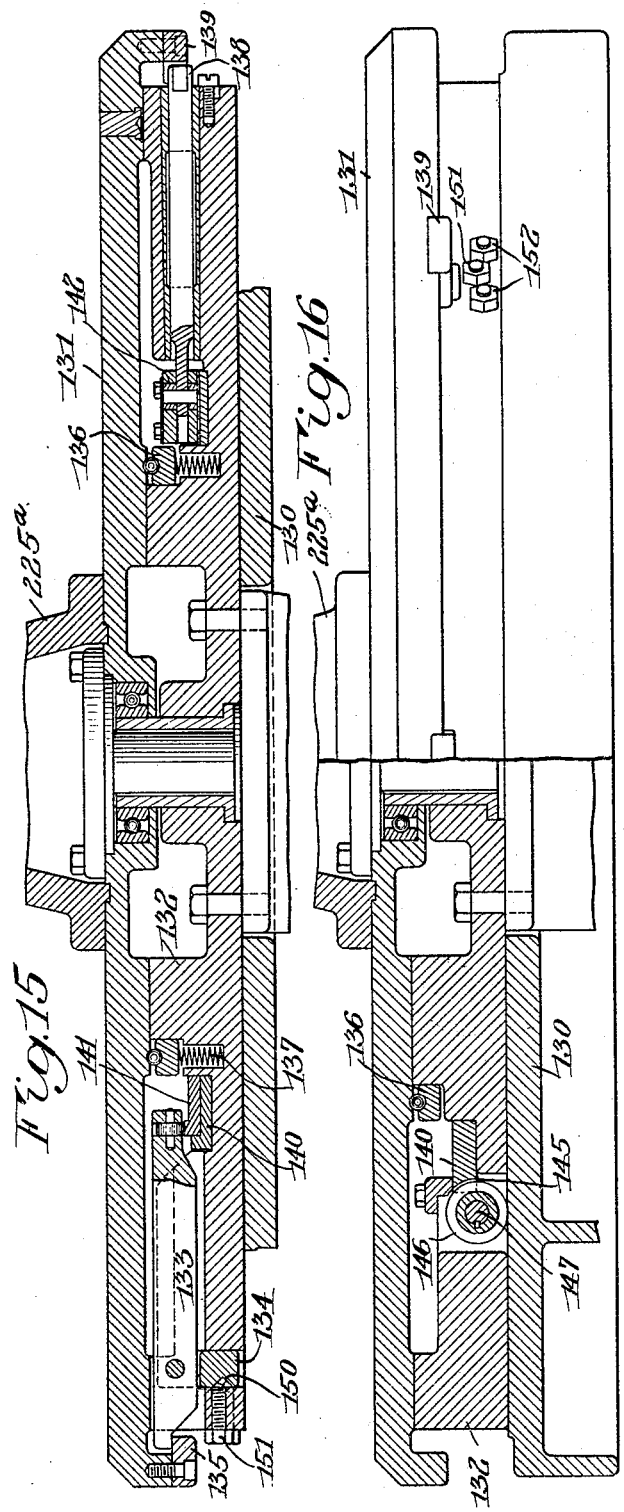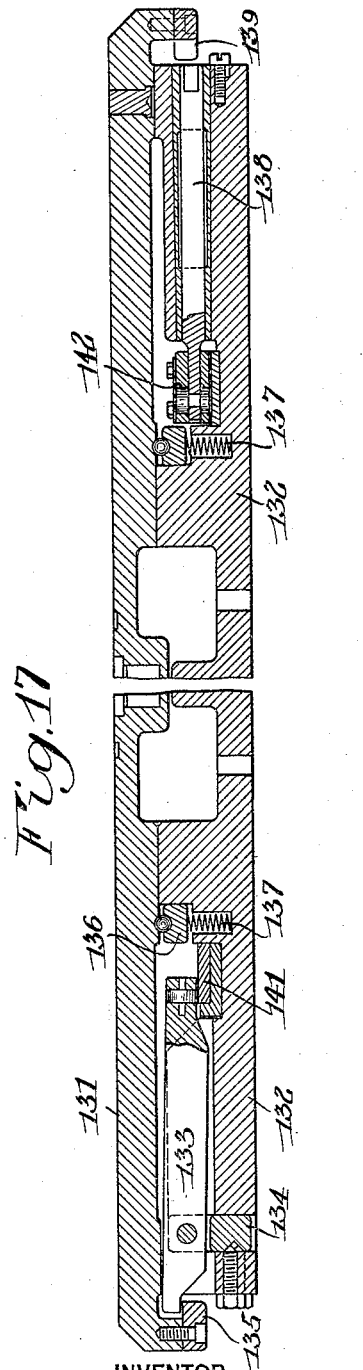

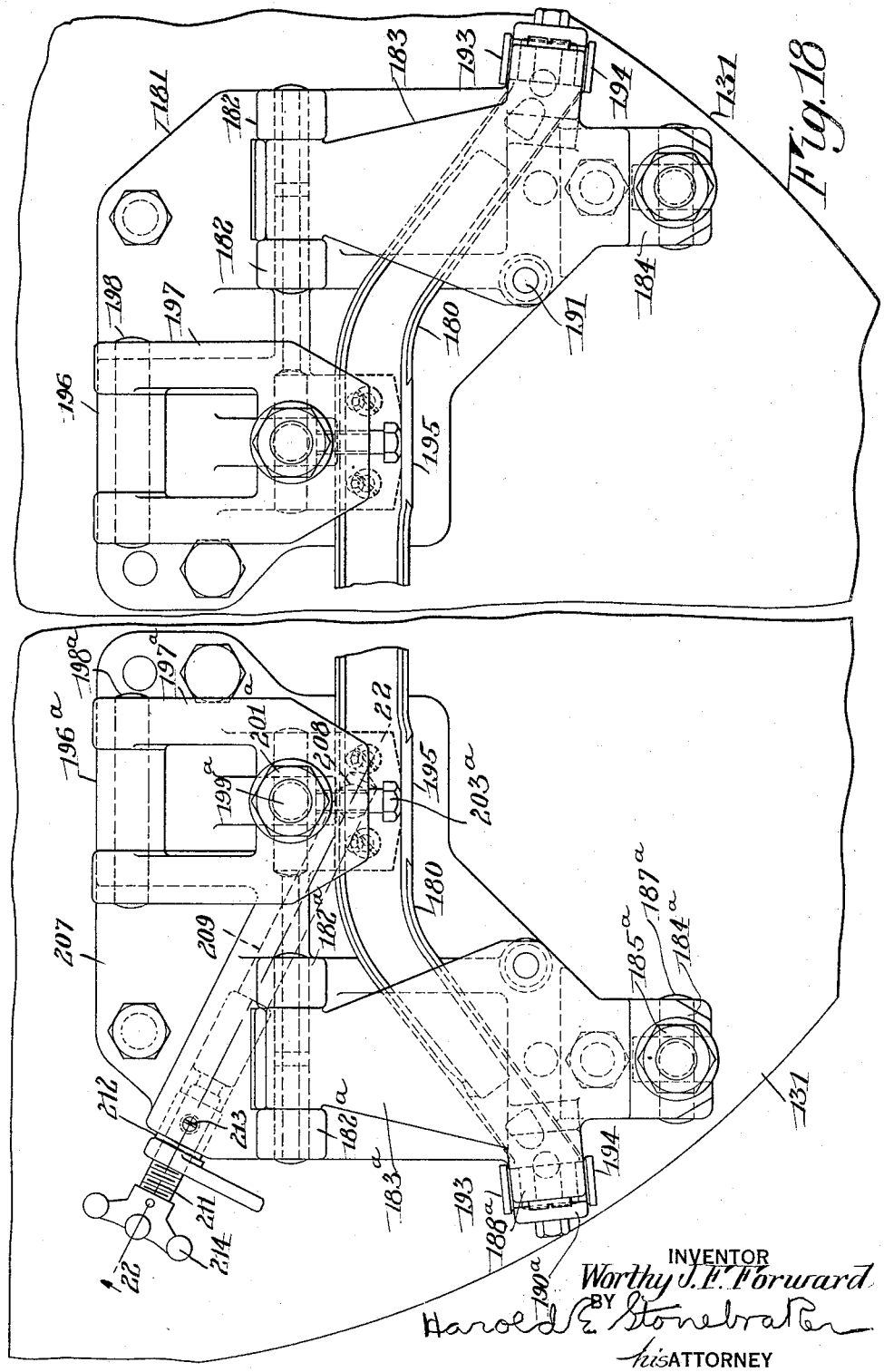

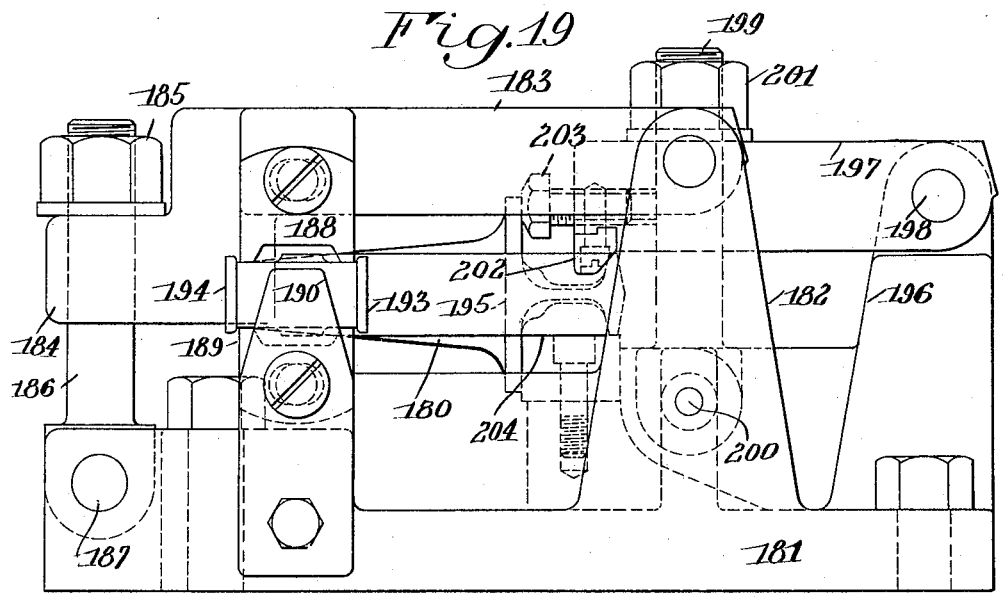
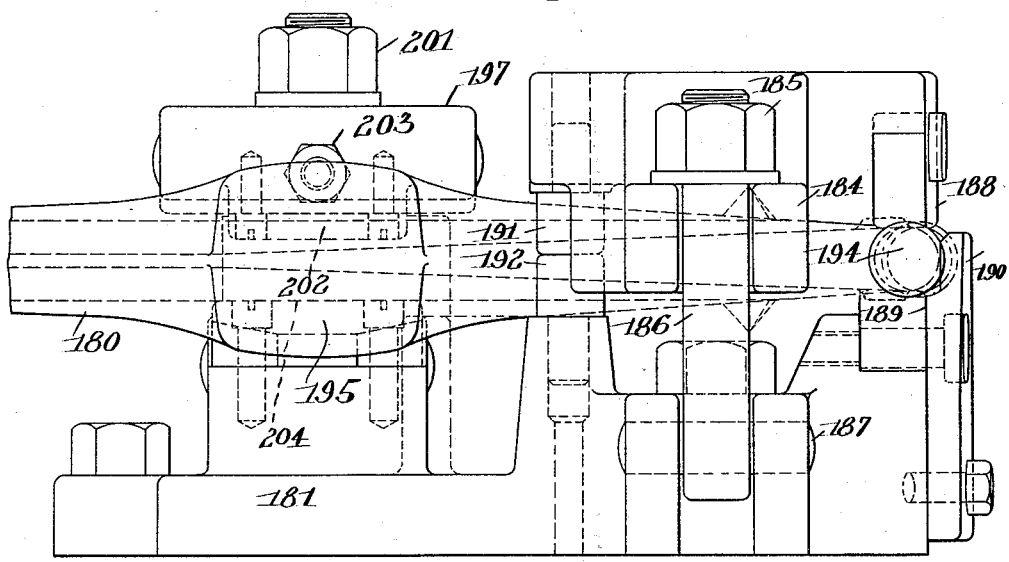

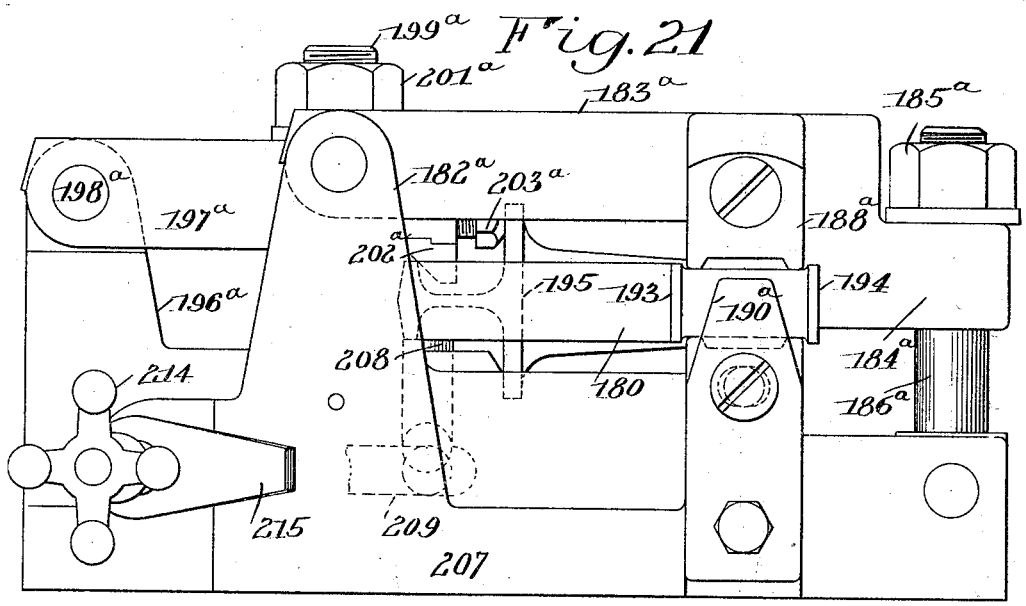
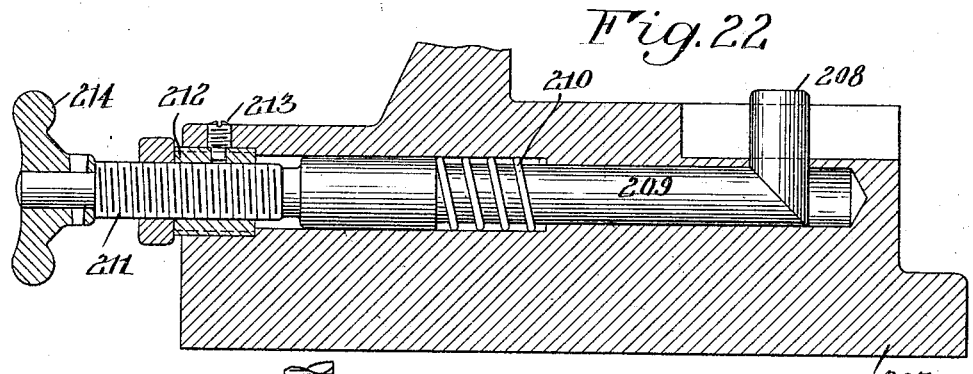
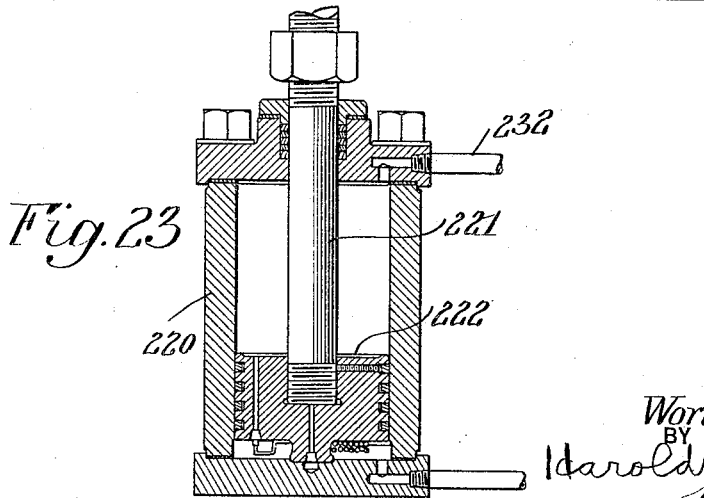

Aug. 23, 1932. W. J. F. FORWARD 1,873,376
MACHINE TOOL
Filed Nov. 30, 1927 19 Sheets-Sheet 17

INVENTOR
Worthy J. F. Forward
BY Harold E. Stonebraker
his ATTORNEY

Aug. 23, 1932.    W. J. F. FORWARD    1,873,376
MACHINE TOOL
Filed Nov. 30, 1927    19 Sheets-Sheet 18

INVENTOR
Worthy J. F. Forward
BY Harold E. Stonebraker
his ATTORNEY

Aug. 23, 1932. W. J. F. FORWARD 1,873,376
MACHINE TOOL
Filed Nov. 30, 1927 19 Sheets-Sheet 19
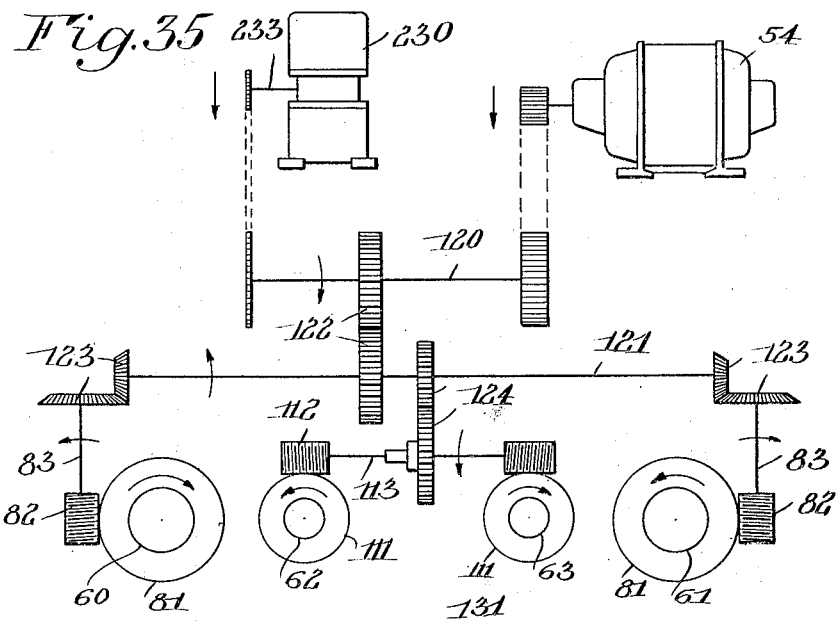
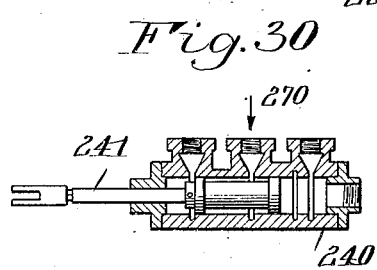
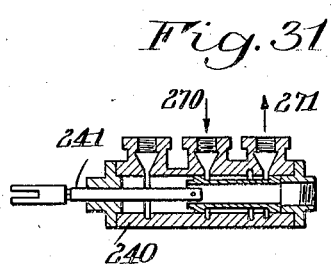
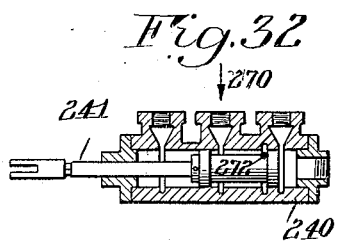
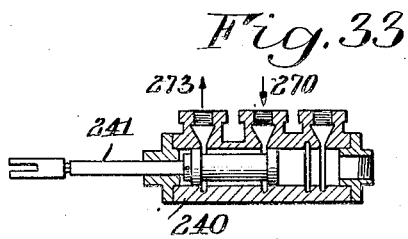
INVENTOR
Worthy J. F. Forward
BY Harold E. Stonebraker
his ATTORNEY Patented Aug. 23, 1932

1,873,376

UNITED STATES PATENT OFFICE

WORTHY J. F. FORWARD, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MACHINE TOOL

Application filed November 30, 1927. Serial No. 236,771.

This invention relates to a machine tool, and has for its principal object the provision of a generally improved construction which is more practical, efficient and satisfactory in operation than any heretofore known.

It is an additional object of the invention to design a machine tool which is especially adapted to mill automobile axles rapidly and accurately.

Another object of the invention is to provide improved mechanism for adjusting the milling cutters of a machine tool.

It is a further object of the invention to provide improved driving mechanism for the moving parts of the machine, and especially to design this driving mechanism in such a way that certain parts of the machine may be shifted to a new position without requiring extensive changes in the drive.

An additonal object of the invention is to provide a generally improved mechanism for holding the work and for bringing it into cooperation with the tool. More especially, it is an object to provide a work supporting mechanism so arranged that a new piece of work may be clamped in place while another piece of work is being operated upon.

Still another object is to provide improved mechanism for moving the work supporting table and for clamping it in the desired position, as well as for clamping the work to the table.

It is a still further object of the invention to provide improved mechanism for raising and lowering the work supporting table to bring the work into cooperation with the tools, as well as novel means for controlling the mechanism for raising and lowering the table.

It is also an object to provide a machine tool with a work support adapted to hold a plurality of pieces of work, this support being movable in one direction to determine which piece of work shall be acted upon by the tool, and in another direction to bring the selected piece of work into actual cooperation with the tool.

With these and other ends in view, the invention comprises the structure and combination of parts which will appear more clearly from the following description when read in conjunction with the accompanying drawings, the novel features being pointed out in the claims following the description.

In the drawings:

Figure 3 is a plan thereof;

Figure 4 is a fragmentary plan illustrating the mounting of the milling cutters and part of the drive mechanism therefor;

Figure 5 is a longitudinal section taken approximately centrally through one of the milling cutters of the outside pair, illustrating the arrangement for adjusting this cutter;

Figure 7 is a fragmentary rear elevation of the machine with parts in section, illustrating the driving mechanism;

Figure 8 is a vertical section taken approximately on the center line of the machine;

Figure 10 is a plan thereof with parts omitted;

Figure 11 is a vertical section through the work table and the supporting mechanism therefor, taken approximately on the center line of the machine;

Figure 13 is a plan of the work table and clamping mechanism therefor, with parts broken away;

Figure 14 is a vertical section taken approximately on the line 14—14 of Figure 13;

Figure 15 is a vertical section through the work table illustrating the clamping and locking mechanism in its effective position;

Figure 16 is a view of the work table partly in elevation and partly in section, illustrating a detail of the clamping and locking mechanism;

Figure 17 is a view similar to Figure 15 showing the clamping and locking mechanism moved to ineffective position so that the table may be turned;

Figure 18 is a plan of one possible embodiment of the mechanism for clamping the work to the work table;

Figure 19 is a side elevation thereof, looking from the right hand end of Figure 18 toward the center of the machine;

Figure 20 is a front elevation of the parts shown in Figure 19;

Figure 21 is a side elevation of part of the clamping mechanism looking from the left hand end of Figure 18 toward the center of the machine;

Figure 22 is a vertical section taken approximately on line 22—22 of Figure 18;

Figure 23 is a sectional view through a hydraulic cylinder for raising and lowering the work table;

Figure 34:
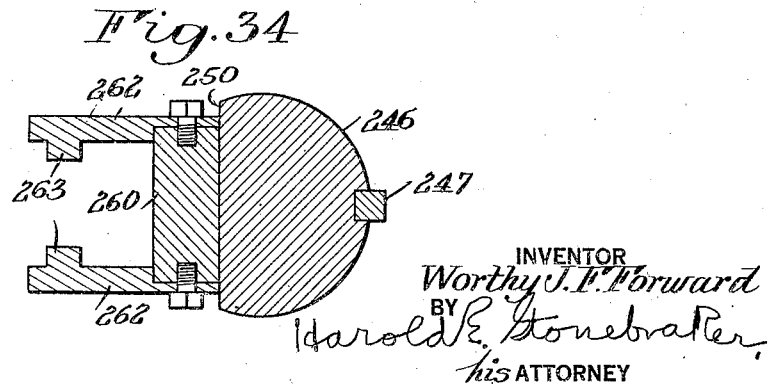
Figure 29:
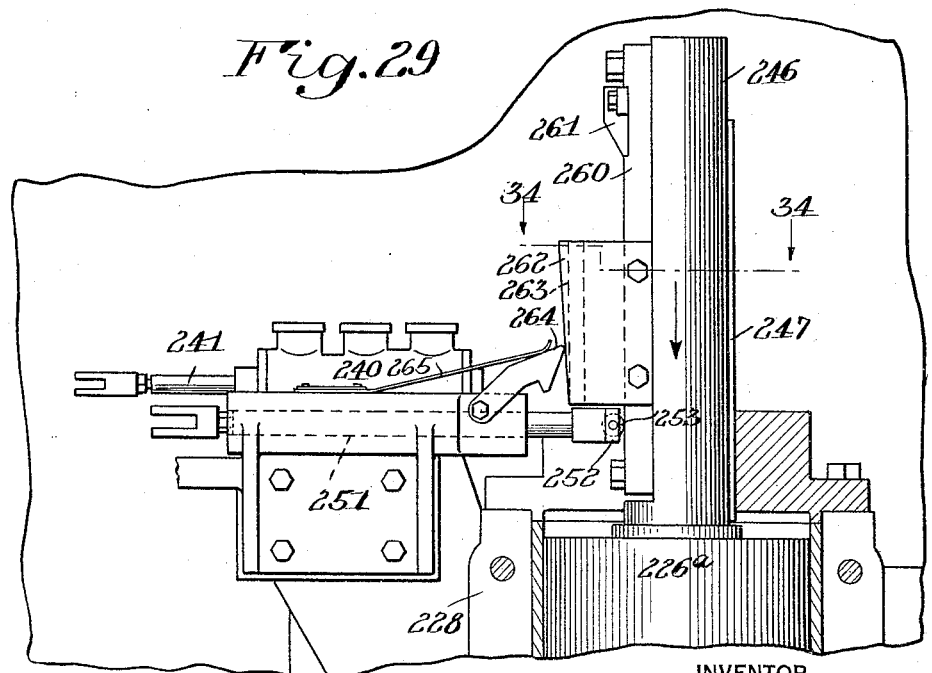
Figure 29 is a similar view showing the control mechanism in its reverse position, causing rapid downward movement of the table.

Figures 30 to 33 inclusive are sectional views through the control valve for the hydraulic pump, showing the mechanism of this valve in the various positions it assumes during the operations shown in Figures 26 to 29 respectively;

Figure 34 is a horizontal section taken approximately on the line 34—34 of Figure 29, illustrating details of a control cam, and Figure 35 is a diagrammatic view illustrating the main driving mechanism of the machine.

As one possible embodiment of the invention, there is illustrated in the drawings a milling machine especially adapted for operation upon front axles of automobiles. It should be understood, however, that this embodiment is given by way of example only, and that many of the details of the machine are equally useful not only in connection with other types of milling machines but also with machine tools of widely varying types.

I. General features of the machine

Figure 1:
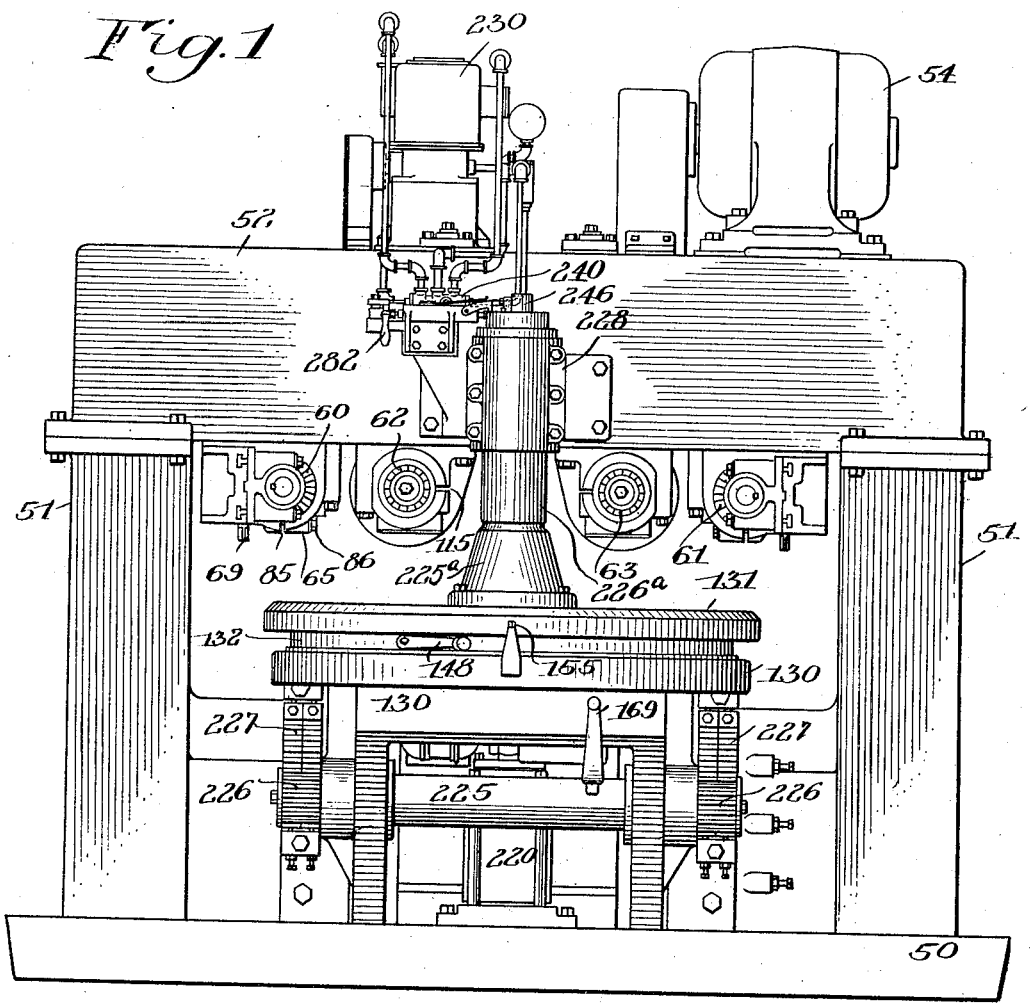
Figure 1 is a front elevation of a machine illustrating one possible embodiment of the invention.

The machine here shown comprises a bed plate 50 on which are mounted uprights or columns 51 supporting a transverse frame member 52, as best shown in Figure 1. Between the columns 51 and slightly in front of them there is mounted a work table 131 to which the work (such as an automobile axle) may be clamped. Mechanism, preferably hydraulic, is provided for raising and lowering this work table so as to bring the work into cooperation with a set of milling cutters 60, 61, 62, and 63, mounted on the underside of the transverse frame member 52, as plainly shown in Figure 1. On the top of the frame member 52 there is mounted a motor 54 for driving the milling cutters and also for operating mechanism, such as the hydraulic pump 230, for raising and lowering the work table 131. These parts will be described in greater detail below, under appropriate headings.

II. Milling mechanism

Referring now particularly to Figures 1, 4, 5, 6 and 8, it will be seen that the milling cutters above mentioned are four in number, consisting of an outer pair 60 and 61 and an inner pair 62 and 63. These cutters are adapted to mill an automobile axle in the manner illustrated clearly in Figure 4, from which it is seen that the outside cutters 60 and 61 finish the ends of the axle while the inside cutters 62 and 63 mill so-called "spring pads" on one side of the axle between the ends thereof.

The two cutters of each pair are similar to each other in all respects except that they are reversed, as plainly shown in Figure 4. A description of one of the milling mechanisms in each pair will therefore be sufficient.

Taking up first the left hand milling cutter 60 of the outside pair, best illustrated in Figure 5, it will be seen that there is provided a housing 65, which may be attached rigidly to the underside of the frame member 52. Within this housing is a sleeve 66 movable longitudinally therein. This sleeve may be provided with rack teeth 67 which may cooperate with pinion teeth formed on a short shaft 68 mounted in the housing 65, the lower end of the shaft projecting below the housing and being provided with a squared end 69 to which a wrench may be applied to rotate the shaft in order to adjust the sleeve 66 longitudinally.

Journalled in this sleeve is a tool spindle 70. This spindle may, if desired, be provided with a tapered portion, such as 71, and a bushing 72 may surround this tapered portion of the spindle. The outer surface of this bushing is formed cylindrically and fits snugly within a cylindrical chamber in the sleeve 66. Contacting shoulders 73 on the bushing and sleeve keep the bushing from moving rightwardly relative to the sleeve, when viewed as in Figure 5, and the taper of the spindle 70 prevents the spindle from moving rightwardly through the bushing. Hence the spindle is restrained against rightward movement relative to the sleeve. Leftward movement of the spindle relative to the sleeve may be prevented by collars held in place by suitable means such as the nut 74 on the spindle. From this it will be seen that the spindle 70 is rotatable within the sleeve 66 but is fixed against longitudinal movement relative thereto. Therefore, rotation of the shaft 68 to move the sleeve longitudinally will result in longitudinal adjustment of the spindle 70.

The milling cutter 60 above mentioned is mounted in any suitable manner on this spindle 70. This cutter consists of two disks adjustable toward and away from each other by means of the threaded sleeves clearly illustrated in Figure 5. One of these disks is intended to mill one side of the axle while the other disk mills the other side, in the manner indicated in Figure 4.

Because of the strain produced on the spindle 70 by the simultaneous operation of the two milling disks, it is desirable to provide a bearing on each side of the milling cutter, and this may be accomplished by the use of a bracket 75 attached to an extension of the housing 65. A sleeve 76 may be journalled in this bracket, as shown in Figure 5, and suitably restrained against longitudinal movement therein, while the spindle 70 extends through this sleeve 76 and is longitudinally movable through the sleeve. Hence this bearing will not interfere with the longitudinal adjustment of the spindle 70.

Preferably, means are provided for preventing dirt and chips from getting into the spindle bearings. These means may include, for example, the annular members 77, one fixed to the bracket 75 and surrounding the rotating sleeve 76, the other fixed to the sleeve 66 and surrounding the spindle 70. Each of these annular members carries packing 78, bearing snugly against the moving parts of the apparatus, and making a practically dirtproof joint. As an additional precaution, a labyrinth 79, comprising a series of angular bends, as shown in Figure 5, may be used in connection with each annular member 77. These bends will catch any dirt or chips which succeed in passing the packing 78, and will thus assist in keeping the bearings clean.

The spindle may be driven in any suitable manner. For instance, a driving sleeve 80 may be rotatably mounted in the housing 65, this sleeve being restrained against longitudinal movement therein. The spindle 70 may extend into the driving sleeve 80 and may be loosely keyed thereto so that a driving connection is established between the sleeve and the spindle without interfering with longitudinal movement of the spindle through the sleeve. A worm wheel 81 is attached to the sleeve 80, and this worm wheel is driven by a worm 82 on a shaft 83. The mechanism for driving this shaft will be described below under subdivision "III. Drive for the milling mechanism".

In operation, it may be desirable to adjust the spindle slightly when the milling cutters have become worn or when it is desired to change the finished dimensions of the axle or other work being operated upon. From the arrangement of the mechanism above described, it will be apparent that this may be accomplished readily by turning the adjusting shaft 68, which will move the sleeve 66 longitudinally. This will result in corresponding longitudinal movement of the spindle 70, and during this movement the spindle will slide through the sleeves 76 and 80, which will remain longitudinally fixed with respect to the housing 65. When the spindle has been adjusted to the desired position, the set screw 84 may be tightened so as to lock the adjusting shaft 68 against movement. As a further means for holding the sleeve 66 in adjusted position, that part of the housing 65 which surrounds the sleeve 66 may be split as at 85 in Figure 1. Tightening of the bolt 86 will tend to draw the edges of the split housing together and will thus clamp the sleeve 66 rigidly in place and prevent accidental movement thereof.

It should be understood that the construction of the mechanism for the other milling cutter 61 of the outside pair is similar to the construction above described in connection with the cutter 60, but is reversed. In other words, parts to the left of the spindle 70 on which the cutter 60 is mounted are placed to the right of the spindle on which the cutter 61 is mounted, and vice versa. This will be readily apparent from an inspection of Figure 4, and it is believed that no further description of the parts relating to the milling cutter 61 will be necessary.

Figure 6:
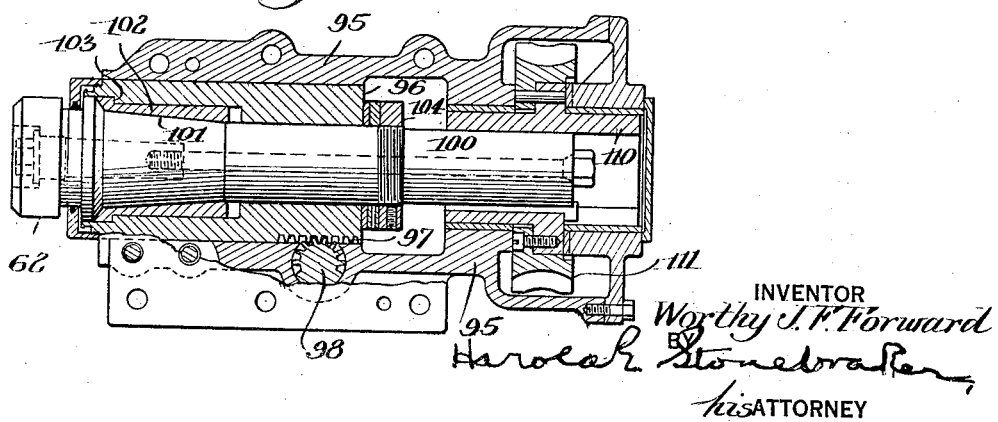
Figure 6 (Sheet 1) is a similar section through one of the cutters of the inside pair.
Figure 2:
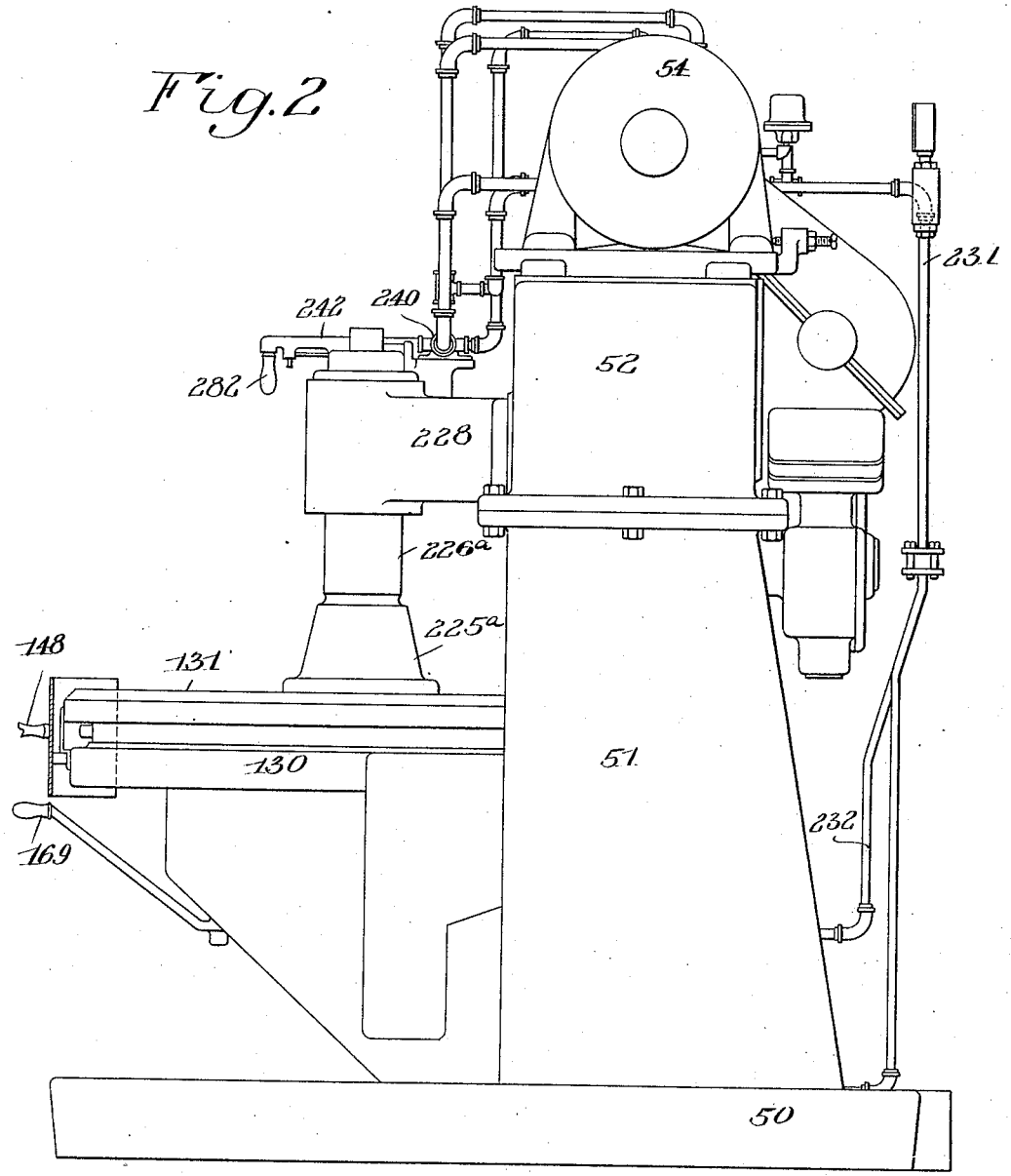
Figure 2 is an end elevation thereof.

The mounting of the milling cutters 62 and 63 of the inside pair is similar in many ways to the mounting of the outside pair 60 and 61 above described. Figure 6 represents a horizontal section through the mounting for the milling cutter 62 and illustrates the details of this mechanism. A housing 95 is attached to the underside of the frame member 52 and in this housing is a sleeve 96 mounted for longitudinal movement in a manner similar to the sleeve 66 described above in connection with the outside pair of milling cutters. This sleeve is provided with rack teeth 97 meshing with teeth cut on a shaft 98, so that rotation of this shaft will cause longitudinal movement of the sleeve. The shaft may be extended upwardly through the frame member 52 and provided with a squared end 99, as shown in Figure 8, to which a wrench may be conveniently applied.

A spindle 100 extends through the sleeve 96 and carries the milling cutter 62. This spindle may have a tapered portion 101 around which is fitted a bushing 102 having a cylindrical exterior surface journalled in a cylindrical chamber in the sleeve 96. A shoulder 103 keeps the bushing 102 from moving rightwardly relative to the sleeve 96 when viewed as in Figure 6, and the taper 101 of the spindle 100 prevents the spindle from moving rightly through the bushing. At the right hand end of the sleeve 96, collars on the spindle 100 may be held in place by any suitable means such as the nut 104. This will prevent leftward movement of the spindle relative to the sleeve, and it is thus apparent that if the sleeve be adjusted longitudinally the spindle 100 will be moved longitudinally and thus adjusted correspondingly.

For driving the spindle 100, various means may be employed such as the sleeve 110 journalled in the housing 95 and restrained against longitudinal movement therein. The spindle 100 may be loosely keyed to this driving sleeve 110, so that the spindle may move freely through the driving sleeve but will always have an operative connection therewith. The sleeve 110 may be driven by means such as the worm gear 111 attached to the sleeve, this worm gear being driven in turn by the worm 112 on the shaft 113, (Figures 4, 8 and 35).

When the milling cutter 62 becomes worn or when it is desired to change slightly the finished dimensions of the work being operated upon, the cutter may be adjusted to its desired position by applying a wrench to the wrench socket 99, thus rotating the adjusting shaft 98 to move the sleeve 96, which will carry with it the spindle 100 and the milling cutter 62 mounted thereon. During this adjusting movement, the spindle will slide lengthwise within the driving sleeve 110, but the driving connection between the spindle and the sleeve will not be disturbed. To assist in holding the parts in their adjusted position, that part of the housing which surrounds the sleeve 96 may be split as at 115, (Figures 1 and 8), and bolts 116, extending up through the frame 52 to an accessible position, may be used to draw the split housing together in order to clamp the sleeve 96 tightly in adjusted position therein. It is obvious that as long as the sleeve 96 is fixed immovably, longitudinal movement of the spindle 100 is prevented, and the milling cutter 62 is therefore held rigidly in the desired position.

The mounting of the other milling cutter 63 of the inside pair is similar to the mounting of the cutter 62 above described, but is reversed, just as the mounting of the cutter 61 is the reverse of that of 60.

III. Drive for the milling mechanism

The two pairs of milling cutters above described may be driven in a variety of ways. One possible embodiment of mechanism for driving them will now be described, referring particularly to Figures 1, 7, 8 and 35. The entire driving mechanism is represented diagrammatically in Figure 35, and it is thought that it may best be understood by keeping this figure in mind.

Mounted in any suitable position, such as upon the transverse frame member 52, there may be placed a driving motor 54, briefly mentioned above in passing. This motor is arranged to drive a shaft 120 which extends along the back of the machine, and this shaft, in turn, drives a shaft 121 through suitable gearing such as 122. The shaft 121 constitutes a driving shaft for the outside pair of milling cutters 60 and 61, the ends of this shaft 121 being operatively connected through the bevel gears 123, for example, with the shafts 83, above described, which drive the milling cutters 60 and 61 through the worms 82 and the worm wheels 81.

Another shaft 113, which has been mentioned above, constitutes a driving shaft for the inside pair of milling cutters 62 and 63, and carries at its ends worms 112 meshing with the worm wheels 111 which drive the spindles on which the cutters 62 and 63 are mounted. This driving shaft 113 may be driven by suitable mechanism such as the gearing 124 from the shaft 121. Thus it is seen that two separate driving shafts are provided, one for the inside pair of cutters and one for the outside pair, and that common driving means (the motor 54 or the drive shaft 120) are provided for driving both of these driving shafts so that the two pairs of cutters are driven from a single source of power. Or, considered from another aspect, means is provided for driving one drive shaft for one pair of spindles and this drive shaft, in turn, drives a second drive shaft for a second pair of spindles.

It will be noted that driving mechanism such as herein disclosed is especially adapted to allow changes to be made in the position of the tool spindles without necessitating extensive changes in the drive mechanism. From an inspection of Figure 4, it will be seen that the spindles of the inside pair of milling cutters 62 and 63 are parallel to each other and to the center line of the machine, while the spindles for the other milling cutters 60 and 61 are placed at a slight angle to the center line. When changes are made in automobile design, it is sometimes necessary to change slightly the angle at which the ends of the axle are to be milled, though the spring pads which are milled by the cutters 62 and 63 are practically always in the same plane, as shown. Therefore, it might be necessary, when using this machine, to vary the angular position of the spindles 70 which carry the cutters 60 and 61, though it would practically never be necessary to change the position of the other spindles 100 carrying the inside pair of cutters 62 and 63.

The present form of driving mechanism has been especially designed with this in mind, and it will be seen that the housings 65 carrying the spindles 70 may be shifted to a different position without requiring extensive alterations in the driving mechanism. The housings 65 may be removed simply by unscrewing the bolts which hold them to the under side of the frame member 52, and they may be bolted in place again in their new position after boring new holes in the frame. The vertical shafts 83 through which the spindles 70 within the housings 65 are driven will always remain vertical no matter in what position the housings are placed on the under side of the frame member 52. Changes in the angular position of the housings therefore will not affect the shafts 83 except to bring them closer together or move them farther apart, depending on the new positions of the rear ends of the housings 65. From this it will be seen that provision has been made for altering the relative positions of the outside pair of milling cutters without making extensive changes in the machine, although no such special provision has been made for changes in the inside pair of milling cutters since such changes are practically never necessary.

*IV. Work table*

Novel mechanism is provided for bringing the work into cooperative relationship with the tools. This mechanism consists in general in a rotatable work table adapted to hold a plurality of pieces of work, and adapted to move bodily so as to carry one of the pieces of work into cooperation with the milling cutters. The mechanism is so arranged that the operator may be clamping one piece of work on the work table while another piece is being operated upon by the tools. When this operation has been finished, the work table is turned so as to bring the new piece of work to the position formerly occupied by the finished piece. The table is then moved bodily so that the new piece of work is acted upon by the milling cutters, and while this is going on the operator removes the finished piece and clamps a fresh piece of work in place. The table is again turned so as to transpose the new piece and the finished piece, and the cycle of operation is repeated.

The mechanism of the work table itself will now be described, while a description of the work holding mechanism and of the means for moving the work table bodily will be reserved for later subdivisions of the specification. In connection with this description of the table, reference may be had in general to Figures 9 to 17 inclusive.

Upon a frame designated generally by the numeral 130, there is mounted a rotatable table 131. The table rotates in a horizontal plane about a suitable vertical axis at the center of the table, as shown particularly in Figures 11 and 15, and means are provided for clamping the table firmly to the frame when desired. Such means is shown particularly in Figures 13 to 17 inclusive and may comprise, for example, a block 132 interposed between the top of the frame 130 and the bottom of the table. On this block 132 is mounted a plurality of clamping levers 133, these levers being fulcrumed on adjustable blocks 134. A flange depends from the lower side of the table at the circumference thereof, and inwardly extending lugs 135 are positioned on this flange in such a way as to form ledges or flanges underlying the outer ends of the levers 133. It will be apparent from an inspection of Figures 15 and 17 that raising the inner ends of the clamping levers 133 will lower the outer ends of these levers which will then bear downward upon the lugs 135. Figure 15 shows a clamping lever with its inner end raised so that it clamps the table, while Figure 17 shows the inner end of the lever depressed so that the outer end is clear of the table.

If desired, the table may be supported in part by ball bearings on a circumferential raceway 136, this raceway being forced upwardly by springs 137 placed beneath it. In practice, the tension of these springs will be designed so as to be almost sufficient to lift the weight of the table 131 off of the block 132, but will not quite accomplish actual separation of the table from the block. When the clamping levers 133 are in their ineffective position, shown in Figure 17, the table will be practically lifted out of contact with the block 132 by means of the springs 137 under the ball bearing raceway 136. Therefore, there will be very little friction between the table and the block and the table may be rotated easily. When the clamping levers 133 are moved to their effective position, however, as shown in Figure 15, the reaction between the outer ends of the levers and the lugs 135 on the table will tend to pull the table downwardly and will clamp the lower surface of the table tightly against the upper surface of the block 132. This will hold the table very firmly in place on the block and will prevent accidental movement thereof during the milling operation.

As a further safeguard against accidental turning of the work table 131, positive locking means may be provided in addition to the clamping levers above described. This locking means may consist, for example, of the longitudinally movable bolt 138 which may be projected into a recess in a lug 139 fixed to the depending flange on the table, as shown in Figure 15, or which may be withdrawn to an ineffective position indicated in Figure 17. The engagement of this bolt with the recess in the lug 139 will positively prevent rotary movement of the table and is thus an additional safeguard to supplement the frictional resistance to turninig which results from the clamping of the table 131 tightly down upon the block 132.

For moving the clamping levers 133 and the locking bolt 138 from effective to ineffective position and vice versa, various mechanisms might be employed. In the embodiment here shown, cam means is used for moving the clamping levers 133 and for shooting the bolt 138. This means may consist of a cam ring 140 mounted in a suitable bearing slot in the block 132, concentric with the pivot of the table. Cam pieces 141 are fixed to this cam ring at intervals corresponding to the spacing of the levers 133, so that there will be one cam piece 141 under the inner end of each of the levers. Each cam piece has a cam formed thereon which is somewhat wedge-shaped, so that one end thereof is higher than the other end. These cams lie directly below and in contact with anti-friction rollers on the inner ends of the levers 133. Obviously, when the cam ring 140 is turned to move the cams so that the high ends thereof move toward the levers, the rollers will be elevated by riding up the slope of the cams and the levers 133 will be moved to clamping position. Similarly, if the cam ring be moved in the opposite position, the rollers will ride down the cam and the levers will be moved to their unclamped position shown in Figure 17.

To operate the bolt 138 from this same cam ring 140, the cam ring may be provided with a cam slot 142 best shown in Figure 13. An anti-friction roller carried by the bolt 138 fits in this slot 142 and cooperates with the edges thereof. This slot is so shaped that when the low sides of the cams 141 are under the clamping levers 133, the locking bolt 138 will be withdrawn, and thus the work table 131 will be free to rotate. As the cam ring 140 moves to position the high sides of the cams 141 below the clamping levers, the locking bolt 138 is concomitantly shot out so as to engage the recess in the lug 139. Thus the work table 131 is clamped securely to the frame by means of the levers 133 and at the same time is effectively locked against possibility of rotation by the bolt 138.

As one possible means for turning the cam ring 140, this ring may be provided throughout a portion of its length with gear teeth 145, shown in Figures 13 and 16. A worm 146 is arranged to mesh with the teeth 145, this worm being mounted on a shaft 147 which is provided with an operating handle 148 at an accessible part of the machine. Movement of the operating handle will therefore turn the worm 146 so as to move the cam ring 140 in one direction or the other, thus either clamping or unclamping the work table.

It is very desirable that some means be provided for adjusting the clamping levers 133, so that all of them will bear against the work table evenly and with the same force. It has been mentioned above that the clamping levers were fulcrumed in adjustable blocks 134. These fulcrum blocks are made adjustable for the purpose just mentioned, and the means for adjusting them may comprise a V-shaped notch 150 in the side of each block and suitable members such as the screws 151 and 152 cooperating with this notch, as shown in Figures 15 and 16. It is obvious from an inspection of Figure 15 that when the clamping lever 133 is in its effective or clamping position, the reaction against the fulcrum will be upward, thus tending to elevate the block 134. Such elevation may be prevented by engagement of the ends of two adjusting screws 152 with the lower side of the notch 150 in the block 134. When the clamping lever is unclamped, downward movement of the block 134 is prevented by engagement of the upper adjusting screw 151 with the upper edge of the notch 150.

If it is found that one of the clamping levers 133 bears more lightly against the work table than the others do, the fulcrum may be adjusted to remedy this by loosening the upper adjusting screw 151 and tightening the two lower screws 152. This will draw the fulcrum block 134 slightly downward. Similarly, if the lever bears too heavily on the work table, this may be corrected by slightly loosening the two lower adjusting screws 152 and then tightening the upper screw 151 so as to raise the fulcrum slightly. Two screws are provided to bear against the lower surface of the notch 150, and only one to bear against the upper surface of the notch, because it is the two lower screws which take all the stress incident to the clamping action of the lever, while the upper screw has none of this force exerted upon it but acts simply to hold the block 134 in place when the clamping lever is loosened and to prevent it from falling downward, due to gravity. Lock nuts may be provided on the outer ends of the adjusting screws 151 and 152, as shown in Figures 15 and 16.

The work table illustrated in the drawings is adapted to hold two pieces of work at diametrically opposite points, so that one piece is being operated upon while the other piece is being clamped in position, in the manner mentioned above. Therefore, it must be possible to clamp the work table in two effective positions, diametrically opposite to each other, one of these positions being used while one piece of work is being brought into cooperation with the tools, and the other position being used when the other piece of work is being operated upon. The table is therefore provided with two of the locking lugs 139 above described, these locking lugs being 180° apart. When the table is in one position, the locking bolt 138 will cooperate with one of these locking lugs 139, and when the table has been unclamped and turned through 180° to its other position, the bolt will cooperate with the other locking lug. The clamping levers 133 and clamping lugs 135 are spaced symmetrically with respect to the diameter joining these two locking lugs, so that the clamping lugs and levers may cooperate with each other equally well no matter in which of its two positions the table may be.

A pointer 155 (Figures 9 and 11) may be used in connection with suitable index marks (not shown) on the periphery of the work table, to indicate to the operator, after turning the table, when it has reached its proper position. As a further aid to the operator in positioning the table accurately before clamping it, a spring detent such as that shown in Figure 14 may be provided. This detent consists of a ball 156, mounted in an opening in the block 132, and constantly urged upwardly against the lower face of the work table 131 by means of the coiled spring 157. At two diametrically opposite points, corresponding to the two effective positions of the table, plugs 158 may be inserted in the table, these plugs having recessed lower ends, as shown in Figure 14. Whenever the work table is correctly alined in either one of its two positions, the ball 156 will seat itself in the recess in the plug 158, and will thus hold the table frictionally in proper position. After a little practice, the operator can easily tell by the feel of the table when the ball is seated in the recess. Furthermore, the spring detent will serve to stop the rotation of the table at the proper point, if it is moving slowly when it reaches this position.

It will be apparent from the foregoing description that the operation of this rotatable work table is very simple. To move it from one of its positions to the other, the operator need only unclamp the table by means of the operating handle 148, turn it through 180°, and clamp it again in proper position. The ball-bearing arrangement 137, above described, reduces friction to a minimum, thus making the table easy to turn.

The provision of power means for turning the work table is very desirable, however, since it speeds up the use of the machine and increases the efficiency thereof. It should be understood that machines of this character are frequently used in factories where rapid production is an important factor, and where the saving of a few seconds in one operation may amount to many dollars in the course of a year. Power mechanism for rotating the table from one position to the other has therefore been provided in this machine, and one possible embodiment thereof will now be described, in conjunction with Figures 9 to 12 inclusive.

The pivot or axle upon which the work table is mounted may be extended downwardly into the space within the frame 130, and may have a worm wheel 160 secured to it. Meshing with this worm wheel is a worm 161 on a shaft 162. A motor 163, conveniently mounted within the frame 130, drives a bevel pinion 164, which meshes with two bevel gears 165 and 166 loosely mounted on the shaft 162. When the motor 163 is running, one of the bevel gears will be driven in one direction, while the other one will rotate in the opposite direction. Clutch mechanism is provided so that either one of these bevel gears may be operatively connected to the shaft 162 on which it is mounted, and thus the shaft may be driven in either direction to rotate the work table one way or the other.

This clutch mechanism may consist, for example, of two conical portions loosely keyed on the shaft 162 so that they may slide back and forth along the shaft, these portions being best shown in Figure 10. When moved to one position, one of the conical portions comes into frictional engagement with a corresponding conical portion of the bevel gear 165 and thus makes an operative connection between this rotating bevel gear and the shaft 162, so that the shaft turns with the bevel gear and moves the work table. At the same time, the other conical portion of the clutch is free from the other bevel gear 166.

If the conical portions be moved along the shaft 162 in the opposite direction, or toward the front as viewed in Figure 10, the other conical portion will then engage a corresponding conical portion on the other bevel gear 166, thus forming an operative connection between this bevel gear and the shaft 162. Since this bevel gear 166 rotates in the opposite direction from the bevel gear 165, it will result in turning the shaft 162 in the opposite direction from that previously described, and thus the work table may be moved in the other direction.

The two conical portions of the clutch are attached to each other so that they move back and forth along the shaft 162 as a unit, and when one of them is in engagement with its bevel bear, the other one is out of engagement with the other bevel gear. There is, of course, a neutral position in which neither of the conical portions is engaged with a gear. For moving the clutch member from one position to the other, means may be employed such as a bell crank lever pivoted at 167, and having a short arm in the nature of a yoke including pins 168 which engage a groove in the clutch member, and a long arm 169 which extends forwardly to a convenient point and serves as an operating member. It will be obvious from Figure 10 that leftward movement of the operating handle 169 will swing the pins 168 rearwardly and will thus engage the clutch with the bevel gear 165. Similarly, swinging the handle 169 to the right will move the pins 168 forwardly and engage the clutch with the other bevel gear 166.

Figure 12:
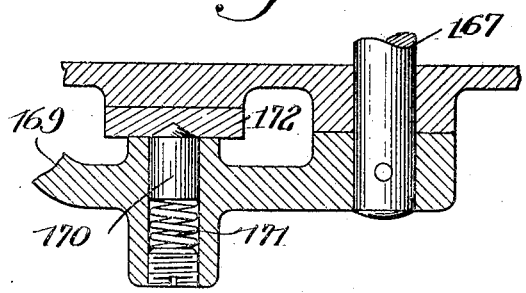
Figure 12 (Sheet 8) is a sectional view illustrating a detail of a control lever shown in Figure 11.

To hold the operating handle in neutral position, and to prevent its accidental displacement therefrom, a spring detent such as that shown in Figure 12 may be employed. The detent comprises a plunger 170 mounted in the handle 169 and a spring 171 constantly tending to force the plunger upward against the lower surface of a fixed plate 172. This plate has a recess formed therein in such a position that it will be in alinement with the plunger 170 when the handle 169 is in its neutral position. The plunger will then be slightly projected into this recess, as shown in Figure 12, and the handle 169 will thus be retained frictionally in its neutral position, but the application of a slight force will move it in either direction when desired. This spring detent is also useful in indicating to the operator when the controlling lever 169 is in neutral position, since the clutch mechanism is hidden from view and there is no way for him to tell when it is exactly in neutral except by the feel of the lever.

The gears 160, 161, 164, 165 and 166, and the clutch mechanism are preferably enclosed in an oil-tight housing 174 so that they may be run constantly in a bath of oil if preferred.

V. Work holding mechanism

It has been stated above that the work table 131 is adapted to hold two pieces of work at diametrically opposite points, one piece being operated upon by the tool while the other piece is being clamped in position. Various forms of mechanism might be employed for holding the work on the table, the exact nature of this mechanism depending, of course, on the particular shape and size of the work to be handled. In the drawings, the front axle of an automobile is shown by way of example as the work being operated upon, and the mechanism for holding this work on the table 131 is especially adapted to cooperate with such an axle. It should be understood, however, that other forms of clamping mechanism may be applied equally well to the work table for holding other pieces of work, and the substitution of such other clamping mechanism is within the purview of this invention.

One possible embodiment of the clamping mechanism is illustrated in Figures 18 to 22 inclusive, and will be described below in connection with these figures. It will be understood that two complete sets of clamping mechanism are used, but only one of these will be described since the two sets are exact duplicates of each other and are placed on opposite sides of the axis of the work table.

Figure 18 is a plan view of a portion of the work table, with parts broken away, and shows the general arrangement of the clamping mechanism. It will be seen that near the right hand end of the axle 180 there is a bed plate 181 attached to the top of the work table 131, and on this bed plate are two clamps shown in Figures 19 and 20. One of these is adapted to hold the extreme end of the axle 180, and comprises a pair of upright members 182 between the upper ends of which is pivoted the rear end of a member 183, the forward end of this member having lips 184 adapted to cooperate with a nut 185 on a bolt 186 pivoted at 187 to the bed plate 181. This pivoted member 183 carries a bearing portion 188 adapted to clamp down on the top of the axle 180 so as to hold it firmly down upon another bearing portion 189 fixed to the bed plate. A member 190, also fixed to the bed plate, lies at the end of the axle and prevents endwise movement thereof. A stop member 191 on the pivoted member 183 cooperates with a second stop member 192 mounted on the bed plate 181 so as to equalize the pressure on the two sides of the center line of the clamp and thus prevent twisting the clamp when it is tightened.

It is obvious that the clamp may be tightened simply by screwing down the nut 185 on the bolt 186, or it may be unclamped by unscrewing the nut sufficiently so that the bolt 186 may be swung forward on its pivot 187, thus releasing the pivoted member 183 and allowing it to be swung upwardly and rearwardly to remove it completely from the top of the axle 180. It will be noted also that this clamp is very effective in holding the axle at the desired point while it is being operated upon, since it is the surfaces 193 and 194 which are to be milled by the milling cutters 60, and the bearing portions 188 and 189 of the clamp are designed to hold the axle as close as possible to the points where the milling operation takes place.

The other clamp mounted on the bed plate 181 is closer to the center of the axle and is intended to hold the axle as near as possible to the surface 195, this being the so-called "spring pad" which is to be milled by the milling cutter 62. This second clamp comprises an upright standard 196 on the bed plate and a somewhat U-shaped member 197, the rear end of which is pivoted at 198 to the standard 196. The forward part of the pivoted member 197 has a groove adapted to receive the bolt 199 pivoted at 200 to the bed plate 181, which bolt carries a nut 201 which may be screwed down against the top of the pivoted member 197. To this pivoted member is attached a bearing block 202 having an oblique bearing surface at the bottom rear corner thereof, as shown in Figure 19, and on the member 197 there is also a bearing member 203 which may be in the nature of a headed screw. On the bed plate 181 is a rectangular bearing block 204.

The action of this clamp is best illustrated in Figure 19, from which it will be seen that screwing down the nut 201 on the bolt 199 will force the pivoted member 197 downwardly. The bearing block 202 will press against a portion of the axle and clamp it firmly down on the block 204, and will at the same time tend to move it rearwardly, due to the oblique surface on the block 202. Rearward movement of the axle will be prevented, however, by contact of flanges on the axle with the front edge of the block 204 and with the stop member 203. Thus, the axle will be held securely and in proper alinement so that the spring pad 195 may be milled accurately.

The parts above described are effective to hold the right hand end of the axle, when viewed as in Figure 18. For holding the left hand end of the axle, another clamping mechanism is employed, this mechanism being the reverse of the right hand clamping mechanism above described. This left hand clamping mechanism rests on a bed plate 207 on which is mounted a clamp for holding the extreme end of the axle. This clamp is a reverse duplicate of the corresponding clamp on the right hand bed plate 181, and the parts of this clamp on the bed plate 207 are given the same reference numerals used above in connection with the other clamp, with the addition of the letter a. In other words, the parts lettered 182ª to 192ª inclusive correspond in every way to the parts 182 to 192 inclusive above described, the only difference being that one set of parts constitutes what might be termed a right hand clamp while the other set forms a left hand clamp. Further description of this left hand clamp 182ª etc., is therefore believed to be unnecessary.

On the left hand bed plate 207 there is also a second clamp for holding the axle at the point where the left hand spring pad 195 is to be milled. Except in one particular mentioned below, this clamp is identical with the clamp 196 to 204 inclusive, above described. The difference in these clamps is that, in the left hand clamp on the bed plate 207, an adjustable member is substituted for the fixed bearing block 204 which is found in the right hand clamp on the bed plate 181. Corresponding parts of the left hand clamp are therefore given the reference numerals 196ª to 203ª inclusive, and each of these parts is identical with the parts 196 to 203 respectively above described.

It is found in practice that there are always slight variations between the different axles to be milled, no two axles being exactly identical. Under these circumstances, any axle may be clamped at three points, but if a fourth clamping point be added, there is danger of springing or warping the axle to a slight extent unless proper adjusting means is provided so as to fit the fourth clamp accurately to the shape of the axle. It is for this reason that the stationary bearing block 204, which is present in the right hand clamp, has been omitted from the left hand clamp 196ª etc., and in its place there is provided an adjustable bearing block 208, shown in Figures 18, 21 and 22.

Various means may be provided for adjusting this block 208. In the embodiment here shown, the lower end of this block is bevelled off to form a cam surface at approximately 45°, and cooperates with a similarly bevelled end of an adjusting member in the nature of a rod 209 mounted in the bed plate 207. A spring 210 (Figure 22) constantly tends to move the adjusting rod 209 outwardly or away from the block 208, so as to permit this block to drop to its lowest position. To move the rod 209 inwardly, so as to raise the block 208 to the desired point, there may be provided a screw member 211 threaded into a bushing 212 fixed to the bed plate 207 by a set screw 213. The screw 211 has a handle 214, rotation of which in the proper direction will move the screw 211 inwardly so that it presses against the end of the adjusting rod 209 and moves the same. Movement of this rod will force the bearing block 208 upwardly, on account of the cam action between these parts. When the device has been adjusted to the desired extent, it may be locked in position by giving a partial turn to the handle 215, which is threaded on the screw 211 and acts as a lock nut thereon.

The operation of the clamping mechanism is as follows: Assuming that an axle is already clamped therein and that the milling operation thereon has been finished, the clamps are first opened so as to permit the removal of this finished axle. Opening of the clamps is effected by unscrewing the nuts 185 and 185ª and swinging the bolts 186 and 186ª forwardly so that the pivoted members 183 and 183ª may be swung upwardly and rearwardly; and also by unscrewing the nuts 201 and 201ª so that the bolts 199 and 199ª may be swung rearwardly into the open space between the two branches of the U-shaped members 197 and 197ª, thus permitting these two U-shaped members to be swung upwardly and rearwardly. All four of the clamps are thus released, and the finished axle may be removed therefrom. A fresh axle is then inserted. The adjusting handle 214 is then unscrewed so as to drop the bearing block 208 to its lowest position. The three clamping members 183, 183ª and 197 may then be brought downward to bear against the top of the axle and the nuts may be tightened lightly to hold the axle in place. The adjusting handle 214 is then screwed up slowly until the operator feels the block 208 come in contact with the lower side of the axle. The block may then be locked in this position by the locking handle 215 and the clamping member 197ª may then be brought downward and tightened with its nut. All of the nuts on all four of the clamping mechanisms may then be tightened to any extent desired without danger of warping the axle or drawing it out of alinement, since the axle rests evenly on all four points of support and no amount of pressure by any one of the clamps can distort it.

VI. Work elevating mechanism

It has been described above how the work, such as the automobile axle 180, is clamped upon the work table 131, and how this table is rotatably mounted so that it may be turned to bring first one piece of work and then another into proper position to be operated upon by the tools. From an inspection of Figure 1, it will be seen that the work table is some distance below the milling cutters and therefore rotation of the table will not actually bring the work into contact with the tools but will simply position it below the tools and in the same vertical plane therewith. It is therefore necessary to move the work table bodily toward the tools in order to bring the work into actual cooperative contact with the tools, and it is the mechanism for effecting this movement which will now be described.

Figure 9:
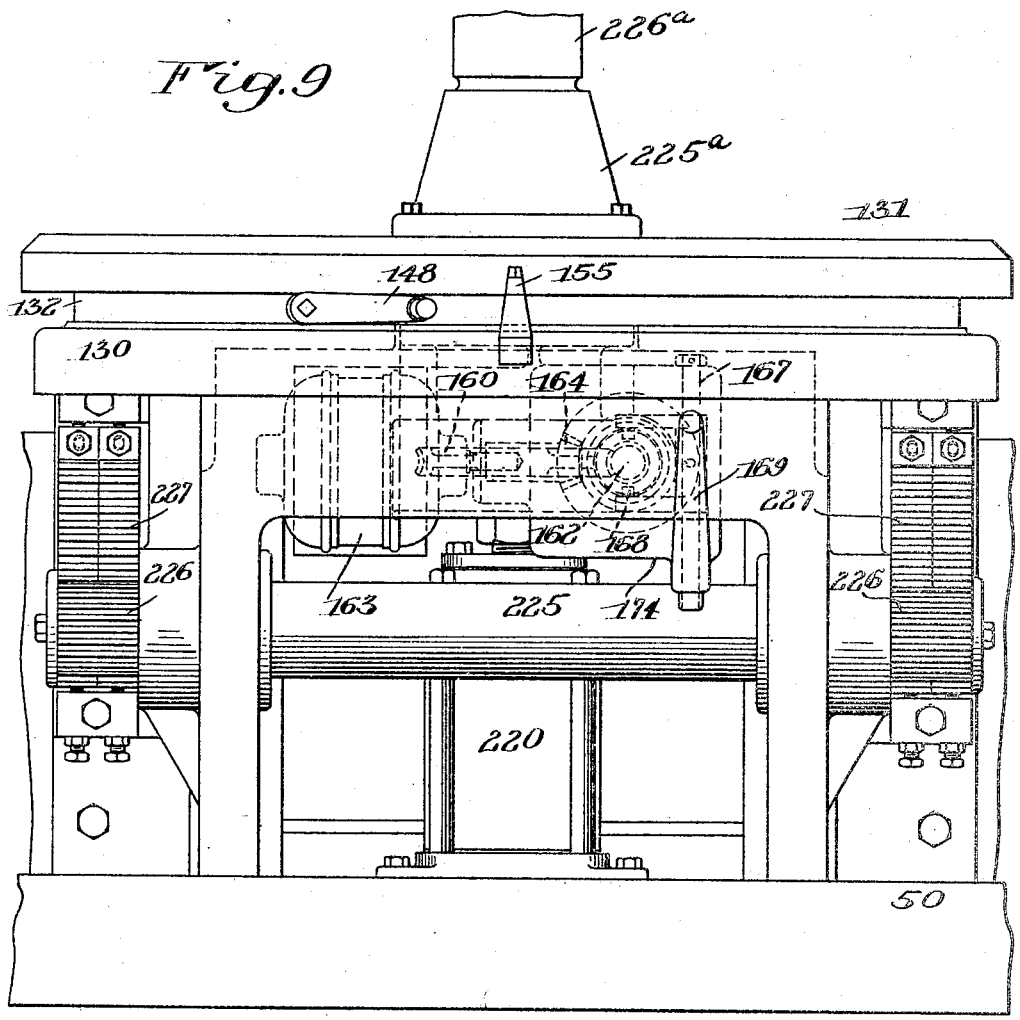
Figure 9 is a front elevation of the work table and its supporting frame.

Referring now especially to Figures 8, 9 and 11, it will be seen that means such as the hydraulic cylinder 220 is provided for moving the work table 131 and its supporting frame 130 bodily. A sectional view of the hydraulic cylinder is shown in Figure 23, and it will be apparent that the cylinder is provided with a piston rod 221 and a heavy duty piston 222 fixed thereto. The upper end of the piston rod 221 is fixed securely to the table-supporting frame 130, while the cylinder itself rests firmly on a part of the frame of the machine.

Suitable guiding means are provided for guiding the frame 130 and the work table 131 during their movements. To accomplish this, an axle 225 is journalled in the frame 130 and carries at its ends pinions 226 meshing with split racks 227 mounted on a stationary part of the machine. The action of the pinions in rolling over the racks as the frame 130 moves up and down insures a parallel motion for the frame and prevents one side of it from rising faster or farther than the other side. The two halves of the split racks 227 may be adjusted relative to each other so as to take up substantially all the backlash between the racks and the pinions, thus bringing the parallel-motion device to its maximum effectiveness.

In addition to the guiding means previously mentioned, other guiding means may be provided above the table. For example, a guiding member 225ª may be fixed to the top of the table at the center thereof, the upper end 226ª of this member being in the form of a cylindrical plunger, and in alinement with the axis of rotation of the table. This guiding portion 226ª is arranged to fit snugly within a cylindrical guide 227 formed in a bracket 228 attached to the front of the transverse frame member 52, as seen in Figures 1 and 8. Because these cooperating guiding surfaces 226ª and 227 are cylindrical and are in alinement with the axis of rotation of the table, they will in no way interfere with the rotation thereof but will simply act as a pivot when the table is turning. When the frame 130 and the table 131 are moved up and down, the cylindrical plunger 226ª will simply slide longitudinally within the guiding surface 227 and will aid in producing a smooth and accurate travel of the table so that the work will be brought into correct alinement with the tools.

For operating the hydraulic cylinder 220 so as to move the work table and its supporting frame bodily, means may be employed such as the oil pump 230, shown in this instance as being mounted on the top of the transverse frame member 52. Piping 231 (Figure 8) runs from the oil pump to the lower or feed end of the hydraulic cylinder, while another pipe 232 connects the pump with the upper or return end of the cylinder. Obviously, when oil or other fluid is forced by the pump into the pipe 231, the fluid pressure below the piston 222 will raise this piston and thus move the work table 131 and its supporting frame 130 upwardly, bringing the work into cooperation with the tools. When the upward movement has been completed, the controls of the pump 230 may be shifted so as to release the pressure in the pipe 231 and apply pressure through the pipe 232, thus forcing the piston down again and returning the work table to its normal position.

The driving shaft 233 of the oil pump may be driven in any suitable manner, such as by a sprocket and chain drive from the shaft 120, which, in turn, is driven by the main motor 54. This driving arrangement is illustrated clearly in the diagrammatic view, Figure 35, and is also shown in Figure 8.

VII. Control for work elevating mechanism

There are various possible ways in which the oil pump 230 may be controlled. One convenient form of control, illustrated in the drawings by way of example, consists of a remote control valve 240 by means of which the operation of the pump may be regulated at a point some distance removed therefrom. The interior detailed construction of the pump, arranged so that it will be controlled by such a valve, is well known in the art, and need not be described here. For an understanding of the present invention, it is sufficient to say that suitable piping, shown in Figures 1 and 8, connects the control valve 240 with the pump 230. The position of mechanism within the control valve determines the flow of fluid through this piping, and this flow, in turn, operates various devices within the oil pump 230 so as to determine the manner in which this pump acts upon the hydraulic cylinder 220. Novel mechanism has been designed for moving the stem 241 of the valve 240 to its various positions, and this mechanism will now be described in detail.

Figure 24:
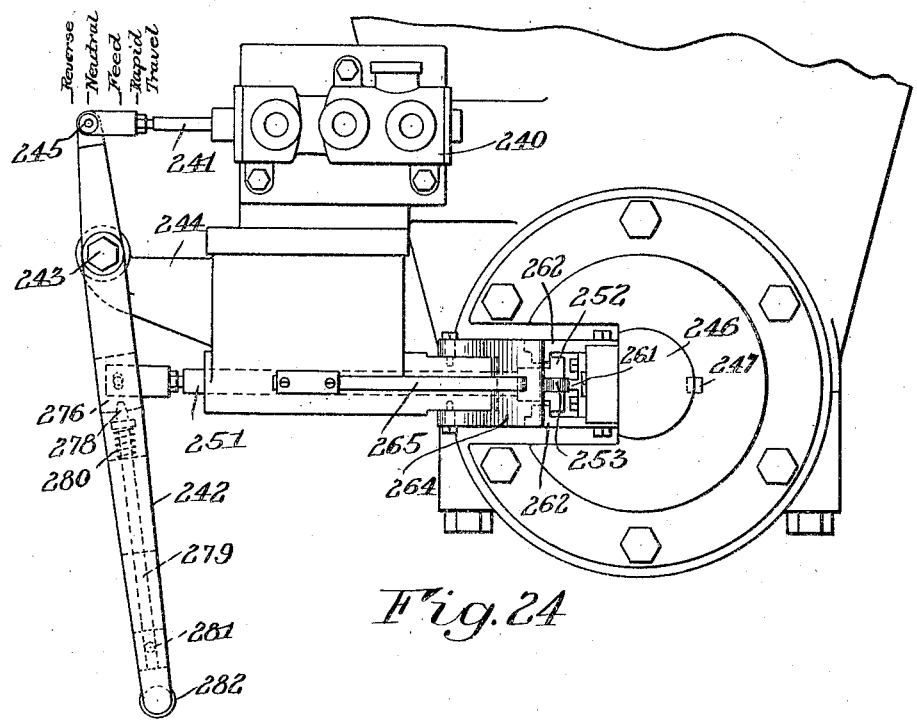
Figure 24 is a plan of the mechanism for controlling the raising and lowering of the work table.

Referring especially to Figure 24, it will be seen that a control member such as a lever 242 is pivoted at 243 to a bracket 244 on a fixed part of the machine, one end of the lever being connected at 245 to the stem 241 of the control valve 240. Movement of the lever 242 will result in moving the valve stem 241, and thus the operation of the pump 230 may be controlled manually when desired. In the ordinary operation of the machine, however, it is preferable to employ automatic mechanism to operate the control valve 240 in a predetermined manner at a predetermined time. This mechanism may be in the nature of cam means connected to the valve operating member 242 so as to move it in response to the movements of other parts of the machine.

As one possible embodiment of cam operating means, there is shown in Figures 8, 24 and 26 to 29, a controlling member 246 rotatably mounted on the plunger or guiding member 226ª and in alinement with the axis of rotation of the work table 131. This controlling member has means for preventing rotation thereof with respect to the frame of the machine, which means may consist of a key 247 carried by the controlling member and fitting loosely in a keyway formed in a plate 248 fixed to the bracket 228. Thus the control member 246 is fixed against rotation relative to the frame of the machine but capable of rotation relative to the members 225ª and 226ª which are fixed to the table 131; and it is also capable of longitudinal movement with respect to the fixed frame of the machine, while it is prevented from moving longitudinally relative to the members 225ª and 226ª and the work table. Consequently, the controlling member 246 will rise and fall in exact accordance with the upward and downward movements of the work table 131 and its supporting frame 130, but the rotary movements of the table will have no effect whatever on the controlling member, which will always remain oriented in the same way.

Figure 25:
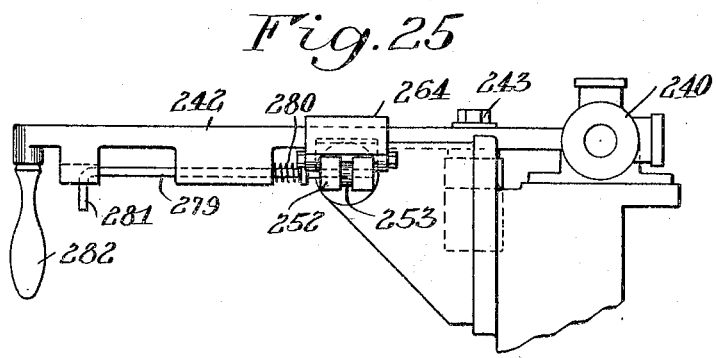
Figure 25 is a side elevation of part of the mechanism shown in Figure 24.

One side of the controlling member 246 may be flattened as at 250, and on this flattened portion there may be formed cam mechanism adapted to cooperate with a cam follower which may include, for example, a shank 251 and a T-shaped head 252. In order to reduce friction at certain times, this T-shaped head may have a recess formed near the center thereof and in this recess may be mounted a roller 253, as shown in Figures 24 and 25. A coil spring 254, shown in Figures 26 and 27, surrounds the shank 251 of the cam follower and constantly tends to move it rightwardly into cooperation with the cam mechanism. This shank 251 is connected by latching mechanism described below to the valve-operating member 242, but for the present, the latching mechanism may be disregarded and the cam follower may be considered as being always connected to the lever. Thus it will be seen that movements of the cam follower will be transmitted to the control lever 242 and from this lever to the stem 241 of the control valve 240. Hence, the valve 240 will be moved in accordance with the movements of the cam follower and the operation of the oil pump may be controlled automatically if suitable means is provided for moving the cam follower in the desired manner. The novel cam mechanism adapted to bring about the desired movements of the cam follower will now be described.

Figure 26:
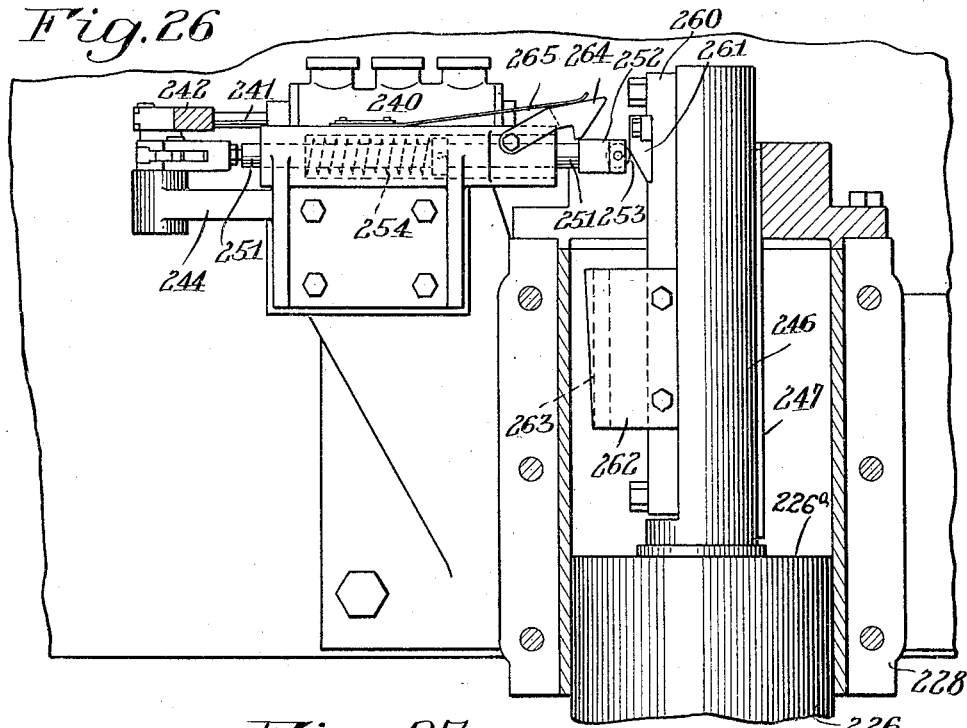
Figure 26 is an elevation of the control mechanism, with parts in section, illustrating the position of the parts when the mechanism is in its neutral position and the work table is at rest.

On the flat surface 250 of the controlling member 246 there is mounted a block 260 having a generally rectangular cross-section, as shown in Figure 34. A member 261 is mounted on the block 260 in such a position that it will be in line with the cam follower when the work table 131 is in its lowest or normal position. This member 261 consists essentially of a rib of somewhat wedge-shape, as shown in Figure 26.

Somewhat below the member 261, side walls 262 are fixed to the block 260 and these walls carry inwardly extending ledges or lateral walls 263, as shown clearly in Figure 34. The space between the inside surfaces of the side walls 262 is somewhat greater than the width of the T-shaped head 252 on the cam follower, so that the wide portion of this T-shaped head may be accommodated between the walls 262, either outside of the lateral walls 263 or between them and the block 260. The head 252 is wider than the space between the two lateral walls 263, however, as shown in Figure 24, so that the head cannot move inward toward the block 260 as long as these lateral walls 263 are opposite it. It will be seen that the side walls and lateral walls together form a somewhat T-shaped slot, when viewed in cross section as in Figure 34.

Figure 27:
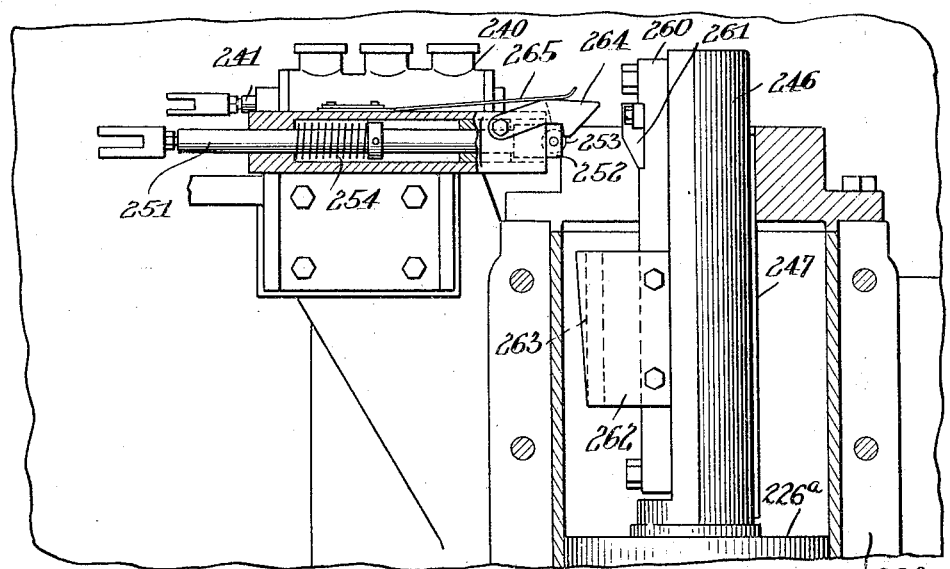
Figure 27 is a view similar to Figure 26 showing the mechanism moved to a position to produce rapid upward travel of the work table.

A latching member 264 is pivoted to a fixed part of the machine and is adapted to be pressed downward by a spring 265 until it overlies the end of the T-shaped head 252, as shown in Figure 27. When the head is held by the latch in this position, the latch resists the push of the spring 254 and prevents the cam follower from moving rightwardly under the influence of this spring.

The operation of the cam mechanism will now be described, with reference particularly to Figures 26 to 33 inclusive.

Figure 26 illustrates the controlling member 246 in the position which it occupies when the work table 131 is in its lowest or normal position. At this time, the roller 253 on the cam follower rests upon the member 261 and holds the cam follower slightly to the left of its extreme right hand position. This corresponds to the neutral position of the control valve 240, as shown in Figure 24. Figure 30 shows the interior of the control valve when the cam follower is in its Figure 26 position, and it will be seen that all ports of the control valve are closed, so that fluid attempting to enter in the direction of the arrow 270 can find no exit. Under these conditions, the oil pump 230 is in its neutral position and no operation of the hydraulic cylinder 220 takes place in any direction.

Assuming now that a piece of work has been brought into proper position to be operated upon by the tools, the operator, in order to start a cycle of the machine, grasps the lever 242 and moves it as far as possible toward the left. This will draw the cam follower to its extreme left hand position, illustrated in Figure 27, and will allow the latch 264 to slip over the end of the head 252, so that the operator may immediately let go of the lever 242 but it will be held by the latch in the same position. This leftward movement of the lever and cam follower has resulted in moving the stem 241 of the control valve 240 to its extreme right hand position, illustrated in Figure 31. In this position, fluid entering at 270 passes out of the valve at 271 and controls the oil pump 230 in such a manner as to cause it to produce rapid upward travel of the work table 131 and its supporting frame 130. In other words, the pump forces fluid at a comparatively rapid rate through the pipe 231 into the lower end of the cylinder 220. The work table then rises rapidly to a point where the work is almost but not quite in contact with the milling cutters.

Figure 28:
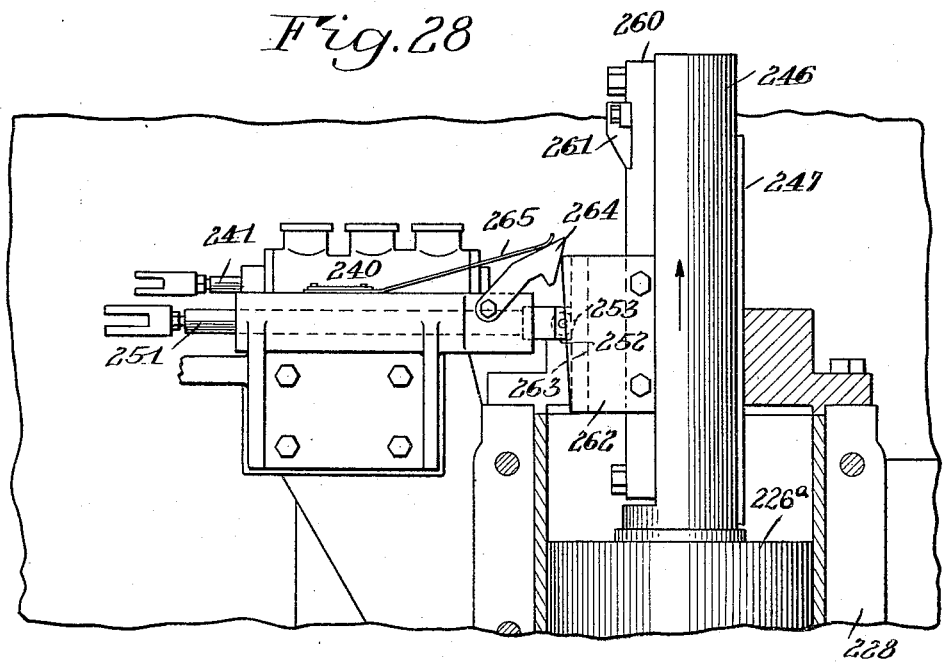
Figure 28 is a similar view showing the control mechanism shifted so as to cause slow upward feed of the work table.

As this point is reached, the upper corner of the side walls 262 of the cam mechanism come into contact with the latch 264, as illustrated in Figure 28, and move this latch upwardly so as to release the cam follower therefrom. The spring 254 then moves the cam follower rightwardly until the T-shaped head thereof rests upon the left hand surfaces of the lateral walls 263. This position of the cam follower corresponds to the position of the control valve shown in Figure 32, in which fluid entering at 270 passes out in the direction of the arrow 272. This causes the oil pump 230 to stop its rapid operation and to commence a feed operation, in which the work table 131 still moves upwardly, but at a much slower rate than was the case during the rapid travel. In other words, the oil pump still forces fluid through the pipe 231, but at a slower rate than before. While this movement of the work table continues, the work moves past the milling cutters and the actual milling operation takes place.

As the work table continues its upward movement, the controlling member 246 finally reaches such a point that the lower edges of the walls 263 pass the cam follower head 252 and releases the cam follower from the restraining influence of these lateral walls 263. The spring 254 may then move the cam follower rightwardly to its extreme right hand position, illustrated in Figure 29. In this position, the roller 253 on the cam follower comes into contact with the block 260. The corresponding position of the control valve 240 is shown in Figure 33, in which the fluid entering at 270 passes out at 273. This has the effect on the oil pump 230 of stopping the feeding operation and commencing a reverse movement, during which the fluid pressure in the pipe 231 is released and pressure is applied through the pipe 232 to the portion of the cylinder 220 above the piston so that the work table is moved downwardly again toward its lowest or normal position. During this downward movement of the work table and of the controlling member 246, the roller 253 rides along the smooth surface of the block 260 and in the course of this movement the T-shaped head 252 passes through the T-slot in the cam mechanism, the wide portion of the head passing through the space between the side walls 262, while the narrower portion of the head passes without difficulty through the restricted passageway between the inner edges of the lateral walls 263. As the downward movement continues, the member 261 comes into contact with the roller 253 and forces the cam follower slightly to the left to bring the control valve 240 to its neutral position and to stop the operation of the pump 230. This is the position illustrated in Figure 26, and the cam mechanism has now gone through one complete cycle.

It will be observed that the cam follower cooperates with two different surfaces on the cam mechanism when moving in opposite directions past the same point. As the controlling member 246 moves upward, the cam follower cooperates with the front surfaces of the lateral walls 263, and as it moves downward past the same point, the cam follower is in contact with the surface of the block 260, behind the lateral walls 263.

After the work table 131 has been turned so as to bring the next piece of work into proper position to be operated upon by the tools, the operator again moves the control lever 242 all the way to the left, until the latch 264 drops over the end of the cam follower 252, and the cycle of movement begins once more.

At times, it may be desirable to disconnect the automatic cam control of the valve 240, so that the operation of the pump 230 may be controlled entirely by hand. For instance, when the cycle above described has commenced, the operator may discover something wrong, and it may be imperative to stop the cycle of movement at once, before the work table travels any farther. Special provision has been made for disconnecting the cam mechanism instantly, and this construction will now be described, referring especially to Figures 24 and 25.

It was mentioned above that the stem 251 of the cam follower was latched to the control handle 242 but that, for the time being, this latch could be disregarded and the stem could be considered as permanently attached to the handle. It is this latch which enables the control handle to be disconnected at will, so that the oil pump may be stopped or reversed instantly in an emergency. Referring to Figures 24 and 25 a block 276 is pivoted to the end of the cam follower stem 251. The rear edge of this block bears against a ledge on the control lever 242, while the front edge of the block has a notch adapted to receive the end 278 of the latching rod 279, the latter being slidably mounted on the lever 242 and constantly urged rearwardly by a spring 280. The pivot connection between the block 276 and the cam follower is preferably slotted, since the control lever moves in an arcuate path while the cam follower is guided for rectilinear movement.

The forward end of the latching rod 279 is bent to form a handle 281, which is conveniently placed so that the operator may pull it with one finger while his hand grasps the handle 282 of the control lever. Whenever it is necessary to stop the machine before it has completed its cycle, or to alter the cycle in any way, the operator simply grasps the handle 282 of the control lever and pulls the latching rod 279 by means of the handle 281 thereof. This withdraws the end 278 of the latching rod from the notch in the block 276, and thus breaks the connection between the block and the control lever and releases the lever entirely from the influence of the cam follower. The lever may then be moved to neutral position or to any other position desired, and it will move the control valve 240 correspondingly. Thus it is seen that simple and instantly operable mechanism has been provided for controlling the movements of the work table manually, though ordinarily these movements are effected automatically.

VIII. Summary

A detailed explanation of the operation of each part of the machine has been given above in connection with the description of each part. It is therefore thought to be unnecessary to recapitulate in great detail, but a brief summary of one cycle of operation will now be given, to aid in understanding the machine as a whole.

Let it be assumed that the main motor 54 and the table-rotating motor 163 are both running, and that a cycle of operation has just been completed. The work supporting table 131 will therefore be in its normal or lowest position, and the clamping mechanism at the rear of the table will hold an axle on which the milling operations have just been completed, while the duplicate clamping mechanism at the front of the table will contain a fresh axle which the operator has clamped in position during the time the other axle was being milled. The cam follower 252 will be in the position illustrated in Figure 26, so that the control lever 242 is in neutral position.

The operator now turns the handle 148 to unclamp the work table 131 from its supporting frame 130. He then manipulates the clutch lever 169 to establish an operative connection between the rotating motor 163 and the worm 161, and thus turns the table through half a revolution or 180°. This turning movement brings the finished axle, which was at the rear of the table, to the front, and puts the fresh axle, which was at the front, at the rear. When the table has been correctly alined in its new position, so that the ball 156 is seated in the recess in the plug 158, the operator then turns the handle 148 in the opposite direction from that in which he first turned it. This rotates the cam ring 140 through a fraction of a revolution, and shoots the bolt 138 to its locking position, at the same time moving the clamping levers 133 so as to clamp the work table 131 firmly down on its supporting frame 130.

Now the operator grasps the handle 282 of the control lever 242, and moves it as far as possible to the left. This will shift the cam follower and the control valve from the neutral position shown in Figures 26 and 30 to the rapid travel position illustrated in Figures 27 and 31. The oil pump 230 then operates to produce a rapid upward movement of the work table and its supporting frame, which continues until the axle at the rear of the table comes almost in contact with the rotating milling cutters 60, 61, 62, and 63. Just as the axle is about to reach the cutters, the automatic cam mechanism functions in the manner which has been described above in subdivision "VII. Control for work elevating mechanism", so that the control lever is shifted to its Figure 28 position and the upward movement of the work table is slowed down to a speed appropriate for the actual milling operation. At the completion of the upward movement, when the milling operation has been finished, the control mechanism assumes its Figure 29 position, which results in rapid downward travel of the work supporting table 131 and frame 130, returning them to their normal position. When they reach normal position, the control mechanism is automatically shifted back to its neutral position shown in Figure 26, as it was before the commencement of the upward movement.

During the upward and downward travel of the work table, described in the preceding paragraph, the operator has not been idle. While this movement was taking place, he has unclamped the finished axle from the front of the work table, and has placed a fresh axle in the clamps, in the manner described above under subdivision "V. Work holding mechanism". This can be accomplished in spite of the travel of the work table, since the movement of the table is not so fast as to interfere with the clamping and unclamping of the axles. Therefore, when the table reaches its lowermost or normal position, it is once more ready to be unclamped from the frame 130 and turned through half a revolution again, and this cycle may be repeated as long as desired.

It will now be seen that a generally improved machine tool has been disclosed, which is capable of rapid and efficient operation. Great pains have been taken to insure the highest degree of accuracy in the finished work, and the greatest possible safety for the operator of the machine. Although the milling cutters are rotating constantly, the loading and unloading operation may be undertaken without any danger whatever from them, since the loading is always done at the side of the work table away from the moving tool, and far removed therefrom.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

I claim:

1. In a machine tool, the combination with a pair of tool spindles, of a second pair of tool spindles arranged in a horizontal plane mounted between the spindles of the first pair in the same horizontal plane, a drive shaft for driving said first pair of spindles, a second drive shaft arranged parallel to the first driving shaft for driving said second pair of spindles, means for driving said first drive shaft, and an operative connection between the first drive shaft and the second drive shaft to drive the latter from the former.

2. In a machine tool, the combination with a pair of tool spindles, of a second pair of tool spindles arranged in a horizontal plane mounted between the spindles of the first pair in the same horizontal plane, all of said spindles lying substantially in a common plane, a worm wheel operatively connected to each of said spindles, a worm for driving each of said worm wheels, a drive shaft on which both of the worms for the second pair of spindles are mounted, separate shafts on which each of the worms for the first pair of spindles are mounted, said separate shafts being substantially perpendicular to said common plane, a drive shaft operatively connected to both of said separate shafts, and means for driving both of said drive shafts.

3. In a machine tool, the combination with a frame including a horizontal portion, of a pair of substantially horizontal tool spindles mounted on the under side of said horizontal portion, a second pair of tool spindles between the spindles of said first pair and also mounted substantially horizontally on the under side of said horizontal portion, a drive shaft extending along said horizontal portion and operatively connected to both of the tool spindles of said first named pair, a second drive shaft operatively connected to both of the tool spindles of the second pair, a motor, means for driving said first named drive shaft from said motor, and means for driving said second drive shaft from said first named drive shaft.

4. In a machine tool, the combination with a stationary frame, of a tool mounted thereon, a table-supporting frame movable relative to said stationary frame, a work table rotatably mounted on said table-supporting frame, said work table being adapted to hold a piece of work below said tool, hydraulic means for elevating both said table-supporting frame and said work table so as to bring said work into cooperative relationship with said tool, and guiding means for guiding said table and table-supporting frame during their elevating movement, said guiding means including a hollow cylindrical guiding member fixed to said stationary frame above said table in alinement with the axis of rotation thereof and a plunger fixed to said table and extending into said hollow guiding member and being guided thereby.

5. In a machine tool, the combination with a tool, of a work table adapted to hold a piece of work below said tool, hydraulic means beneath said table for elevating the table so as to bring said work into cooperative relationship with said tool, guiding means above the table for guiding the same during its elevating movement, a pair of racks fixed to a stationary part of the machine, a shaft attached to said work table, and pinions on said shaft meshing with said racks, said pinions rolling over said racks during the elevating movement of said work table so as to equalize the movement of two opposite sides thereof.

6. In a machine tool, the combination with a tool, of a table-supporting frame, a work table rotatably mounted on said frame, said work table being adapted to hold a piece of work below said tool, a motor mounted on said frame, operative connections between said motor and said table for rotating the latter from the former, and means for elevating the frame, the motor, and the work table, as a unit, so as to bring said work into cooperative relationship with said tool.

7. In a machine tool, the combination with a stationary frame, of a tool mounted thereon, a table-supported frame movable relative to said stationary frame, a work table rotatably mounted on said table-supporting frame, said work table being adapted to hold a piece of work below said tool, a hydraulic cylinder beneath said work table for elevating both said table-supporting frame and said work table so as to bring the work into cooperative relationship with said tool, an oil pump mounted on said stationary frame, a motor for driving said oil pump, and connections between said hydraulic cylinder and said oil pump for operating the former from the latter.

8. In a machine tool, the combination with a stationary frame, of a movable tool mounted thereon, a table-supporting frame movable relative to said stationary frame, a work table rotatably mounted on said table-supporting frame, said work table being adapted to hold a piece of work below said tool, a hydraulic cylinder beneath said work table for elevating both said table-supporting frame and said work table so as to bring the work into cooperative relationship with said tool, an oil pump mounted on said stationary frame, a single motor for driving said oil pump and said movable tool, and connections between said hydraulic cylinder and said oil pump for operating the former from the latter.

9. In a machine tool, the combination with a tool, of a rotatable work table adapted to hold a piece of work, means for moving said work table in the direction of its axis of rotation so as to bring the work into and out of cooperative relationship with said tool, means for guiding said work table during its said axial movement, said guiding means including a part fixed to said table and rotating with the table when it is rotated, a controlling member rotatably mounted on said part in alinement with said axis of rotation, said controlling member being restrained against turning when said work table rotates but capable of movement when said work table moves in the direction of said axis, and means for controlling the axial movement of said work table from said controlling member.

10. In a machine tool, the combination with a tool, of a rotatable work table adapted to hold a piece of work, means including a pump and a hydraulic cylinder for moving said work table in the direction of its axis of rotation so as to bring the work into or out of cooperative relationship with said tool, a controlling member rotatably secured to said work table in alinement with said axis of rotation, said controlling member being restrained against turning when said work table rotates but capable of movement when said table moves in the direction of said axis, and means for controlling the action of said pump from said controlling member.

11. In a machine tool, the combination with a tool, of a rotatable work table adapted to hold a piece of work, means including a pump and a hydraulic cylinder for moving said work table in the direction of its axis of rotation so as to bring the work into or out of cooperative relationship with said tool, a controlling member moving with said work table when the table is moved axially but restrained against turning with the table when the table is rotated, hydraulic means for controlling the action of said pump, said means including a remote control valve placed at a distance from said pump, and means for operating said valve from said controlling member.

12. In a machine tool, the combination with a tool, of a work support adapted to hold a piece of work, means for moving said work support so as to bring the work into or out of cooperative relationship with said tool, cam mechanism moving with said work support, and a cam follower cooperating with said cam mechanism to control the movement of said work support, said cam follower cooperating with one surface on said cam mechanism when said work support moves past a given point in one direction, and cooperating with a different surface on said cam mechanism when said work support moves past said point in the opposite direction.

13. In a machine tool, the combination with a tool, of a work support adapted to hold a piece of work, means for moving said work support so as to bring the work into or out of cooperative relationship with said tool, cam mechanism moving with said work support, and a cam follower cooperating with said cam mechanism to control the movement of said work support, said cam follower being adapted to be held entirely out of contact with said cam mechanism during part of the movement of the cam mechanism in one direction, said follower being automatically moved into cooperation with one surface of said cam mechanism at a predetermined point in the travel thereof, and automatically moved into cooperation with a second surface of the cam mechanism at another predetermined point in the travel thereof.

14. In a machine tool, the combination with a tool, of a work support adapted to hold a piece of work, means for moving said work support so as to bring the work into or out of cooperative relationship with said tool, cam mechanism moving with said work support, a cam follower cooperating with said cam mechanism, said cam follower controlling the means for moving said work support, and a latch adapted to hold said cam follower out of contact with said cam mechanism, said latch being automatically tripped when said work support reaches a predetermined position so as to allow the cam follower to cooperate with the cam mechanism.

15. In a machine tool, the combination with a tool, of a work support adapted to hold a piece of work, means for producing relative movement between said tool and work support so as to bring the work into or out of cooperative relationship with said tool, and cam mechanism and a cam follower movable relatively to each other, said cam follower controlling said means for producing relative movement between the tool and work support, said cam mechanism including two surfaces spaced from each other, one of said surfaces cooperating with said cam follower during movement in one direction, and the other of said surfaces cooperating with said cam follower during movement in the other direction.

16. In a machine tool, the combination with a tool, of a work support adapted to hold a piece of work, means for producing relative movement between said tool and work support so as to bring the work into or out of cooperative relationship with said tool, cam mechanism and a cam follower movable relatively to each other in response to the relative movements of said tool and work support, said cam follower controlling said means for producing relative movement between the tool and work support, a latch for holding said cam follower out of contact with said cam mechanism in a position to cause relative movement of the tool and work support, means for tripping said latch at a predetermined point so as to cause said cam follower to cooperate with one surface of the cam mechanism to produce relative movement in the same direction but at a different rate, means for shifting said cam follower at a predetermined point to a second surface of the cam mechanism to produce relative movement in the opposite direction, said cam mechanism including means for shifting said follower to a fourth position at a predetermined point to stop said relative movement.

17. In a machine tool, the combination with a tool, of a work support adapted to hold a piece of work, means for producing relative movement between said tool and work support to bring the work into and out of cooperative relationship with the tool, of controlling means therefor including cam mechanism, a cam follower adapted to cooperate therewith, a control handle for controlling a part of the machine, and means for connecting said cam follower to said control handle or disconnecting it from the control handle instantly at will.

18. In a machine tool, the combination with a tool, of a work support adapted to hold a piece of work, means for producing relative movement between said tool and work support to bring the work into and out of cooperative relationship with the tool, of controlling means therefor including cam mechanism, a cam follower adapted to cooperate therewith, a control handle for controlling a part of the machine, a block pivotally connected to said cam follower, and latching means for connecting said block at will to said control handle.

19. In a machine tool, the combination with a tool, of a work support adapted to hold a piece of work, means for producing relative movement between said tool and work support to bring the work into and out of cooperative relationship with the tool, of controlling means therefor including cam mechanism, a cam follower adapted to cooperate therewith, a control handle for controlling a part of the machine, a block pivotally connected to said cam follower, a notch in one side of said block, and latching means on said control handle, said latching means including a part resiliently projected into said notch so as to secure the block to the handle, said part being withdrawable from said notch to disconnect the block from the handle instantly.

20. In a machine tool, the combination with a support for a work piece, of a pair of relatively inclined tool spindles, a pair of parallel tool spindles arranged between and in the same horizontal plane as the first pair of tool spindles, cutters on said tool spindles, a drive shaft, and worm and gear connections from said drive shaft to each of said spindles, the worms for driving one pair of spindles being arranged substantially perpendicular to the worms for driving the other pair, and the arrangement of the cutters such that they are adapted to cooperate with relatively inclined portions of a bent work piece.

21. In a machine tool, the combination with a frame, a cutting tool thereon, of a rotatable work table movable toward and from the cutting tool, means for moving the work table, a device fixed against rotation with the work table but movable therewith, and a plurality of cam members mounted on said device for controlling the movements of the table and stopping its moving means.

22. In a machine tool, the combination with a frame, a cutting tool thereon, of a rotatable work table movable toward and from the cutting tool, means for moving the work table, a guide concentric with the work table and movable therewith, a device movable with said guide but fixed against rotation therewith, and a plurality of cam members mounted on said device for controlling the movements of the work table and stopping its moving means.

23. In a machine tool, the combination with a frame, a cutting tool thereon, of a rotatable work table movable toward and from the cutting tool, means for moving the work table, a guide concentric with the work table and fixed thereto, a device on said guide fixed against rotation but movable therewith, and a plurality of cam members mounted on said device, one of said cam members being adapted to control the movements of the work table toward and from the cutting tool, and another of said cam members being adapted to stop the work table when it reaches the limit of its movement away from the cutting tool.

24. In a machine tool, the combination with a frame, a cutting tool revoluble thereon, of a work support adapted to hold a work piece, means for moving the work support to bring the work piece into and out of cooperative relation with the tool, means for controlling the movement of the work support comprising a cam device including a portion having a T-shaped slot therein movable with the work support, a cam follower movably mounted on a part fixed relatively to the work support and having a T-shaped head adapted to pass through said slot when the work support moves in one direction and to ride on said cam device outside of said slot when the work support moves in the other direction, and means for moving said follower.

25. In a machine tool, the combination with a frame, a cutting tool revoluble thereon, of a work support adapted to hold a work piece, means for moving the work support to bring the work piece into and out of cooperative relation with the tool, means for controlling the movement of the work support comprising a cam device including a cam surface movable with the work support, side walls projecting forwardly from said cam surface, inwardly projecting walls on said side walls to form a second cam surface, said inwardly projecting walls having a space between them, a cam follower movable on a part fixed relatively to the work support and having a shank adapted to pass through the space between said inwardly projecting walls, and a head wider than the space between said walls but adapted to pass between said lateral walls, said cam follower being adapted to ride on said second cam surface when the work support moves in one direction or to extend through the space between said inwardly projecting walls and ride on said first mentioned cam surface when the work support moves in the other direction, and means for moving said follower.

26. In a machine tool, the combination with a frame, a cutting tool revoluble thereon, of a work support adapted to hold a work piece, means for moving the work support to bring the work piece into and out of cooperative relation with the tool, means for controlling the movement of the work support comprising a cam device movable with the work support, a cam follower movable on a part fixed relatively to the work support and adapted to cooperate therewith, resilient means tending to move said follower toward said cam device, a latch for holding said follower out of contact with said cam device, and means on said cam device for tripping said latch to permit said resilient means to move said cam follower into cooperative engagement with said cam device.

27. In a machine tool, the combination with a support for a bent work piece, of a pair of relatively inclined tool spindles, tools on said spindles arranged to cooperate with the ends of said work piece, a second pair of tool spindles arranged in the same plane and between said first mentioned tool spindles, tools on said second pair of spindles arranged to cooperate with portions of said work piece intermediate its ends, a drive shaft for driving said spindles, and worm and gear connections between said drive shaft and each of said spindles.

In witness whereof, I have hereunto signed my name.

WORTHY J. F. FORWARD.